United States Patent
Hibi et al.

(10) Patent No.: US 6,927,499 B2
(45) Date of Patent: Aug. 9, 2005

(54) POWER GENERATOR AND SYSTEM COMPRISING IT

(75) Inventors: Shinji Hibi, Osaka (JP); Masayoshi Tokiwa, Osaka (JP); Toshinobu Fujisawa, Osaka (JP); Tadatatsu Kanemoto, Osaka (JP); Hiroshi Yoshimoto, Osaka (JP); Kozo Yamamuro, Osaka (JP); Mamoru Fukae, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 10/504,396

(22) PCT Filed: Feb. 4, 2003

(86) PCT No.: PCT/JP03/01140

§ 371 (c)(1),
(2), (4) Date: Jan. 24, 2005

(87) PCT Pub. No.: WO03/069758

PCT Pub. Date: Aug. 21, 2003

(65) Prior Publication Data

US 2005/0116475 A1    Jun. 2, 2005

(30) Foreign Application Priority Data

| Feb. 14, 2002 | (JP) | ............................. 2002-036680 |
| Feb. 14, 2002 | (JP) | ............................. 2002-036681 |
| Feb. 14, 2002 | (JP) | ............................. 2002-036730 |

(51) Int. Cl.$^7$ ............................................. H02P 9/04
(52) U.S. Cl. ........................ 290/40 B; 290/4 R; 322/7
(58) Field of Search .......................... 290/1 A, 2, 4 R, 290/40 A; 322/7, 9; 307/64, 149

(56) References Cited

U.S. PATENT DOCUMENTS

| 3,665,495 A | * | 5/1972 | Carter et al. .................. 307/67 |
| 4,731,547 A |  | 3/1988 | Alenduff et al. |
| 5,751,069 A | * | 5/1998 | Rajashekara et al. ..... 290/40 C |

(Continued)

FOREIGN PATENT DOCUMENTS

| EP | 0 568 822 A2 | 11/1993 |
| EP | 1 045 127 A2 | 10/2000 |

(Continued)

*Primary Examiner*—Nicholas Ponomarenko
(74) *Attorney, Agent, or Firm*—Knobbe, Martens, Olson & Bear LLP

(57) ABSTRACT

A control unit (5) for controlling each device which constitutes a electric power generator set (1) is provided with an operation-and-display device (28) so constituted as to calculate each electric power value data and each electric energy data on external electric power, generated electric power, and load electric power on the basis of sensed data on each value of external electric power and generated electric power transmitted from inverters (6a, 6b) and as to store these calculated data and the sensed data, and connected to the electric power generator set (1) by wires or radio. A cogeneration system comprising the electric power generator set (1) is so constituted that data on the electric power generation current value of the external electric power source and the electric power generator set (1) and data on water-heat energy are sensed and transmitted to the control system (2), and that the control system calculates data on an external electric energy, a generated electric energy, a load electric energy, a water-heat energy recovery quantity, and an energy efficiency to display the calculated data on the operation-and-display device (28).

19 Claims, 20 Drawing Sheets

U.S. PATENT DOCUMENTS

| | | | | |
|---|---|---|---|---|
| 5,901,683 A | * | 5/1999 | Patel | 123/352 |
| 5,949,153 A | | 9/1999 | Tison et al. | |
| 6,166,525 A | * | 12/2000 | Crook | 322/11 |
| 6,355,987 B1 | * | 3/2002 | Bixel | 290/52 |
| 6,404,075 B1 | * | 6/2002 | Potter et al. | 307/64 |
| 6,459,175 B1 | * | 10/2002 | Potega | 307/149 |
| 6,838,781 B2 | * | 1/2005 | van de Loo | 290/40 B |

FOREIGN PATENT DOCUMENTS

| | | |
|---|---|---|
| JP | 64-008832 | 1/1989 |
| JP | 09-149653 | 6/1997 |
| JP | 2001-021594 | 1/2001 |
| JP | 2001-112176 | 4/2001 |
| JP | 2002-247765 | 8/2002 |
| JP | 2002-247769 | 8/2002 |

* cited by examiner

Fig. 2 comparative table of electric energy and charge between
the commercial power and the generated power in every hour

| time / electric energy | commercial electric energy (kWh) | generated electric energy (kWh) | monthly charge (¥/month) | fuel consumption (m³/h) |
|---|---|---|---|---|
| · | · | · | · | · |
| · | · | · | · | · |
| · | · | · | · | · |
| 13:00~14:00 | **** | **** | **** | **** |
| 14:00~15:00 | **** | **** | **** | **** |
| 15:00~16:00 | **** | **** | **** | **** |
| 16:00~17:00 | **** | **** | **** | **** |
| · | · | · | · | · |
| · | · | · | · | · |
| · | | | · | |

Fig. 3 comparative table of electric energy and charge between the commercial power and the generated power in every month

|  | commercial power | generated power | load power | fuel |
|---|---|---|---|---|
| power consumption (kWh/month) | **** | **** | **** | — |
| unit cost of power (¥/kWh) | **** | **** | **** | — |
| monthly charge (¥/month) | **** | **** | **** | — |
| fuel consumption (m³/h) | — | — | — | **** | comparison of electric energy between the commercial power and the generated power in every hour comparison of electric energy between the commercial power and the generated power in every month

Fig. 9

| electric energy / time | commercial electric energy (kWh) | generated electric energy (kWh) | load electric energy (kWh) | fuel consumption (m3/h) | hot water energy recovery amount (kWh) | virtual load electric energy (kWh) |
|---|---|---|---|---|---|---|
| . | . | . | . | . | . | . |
| . | . | . | . | . | . | . |
| . | . | . | . | . | . | . |
| 13:00~14:00 | **** | **** | **** | **** | **** | **** |
| 14:00~15:00 | **** | **** | **** | **** | **** | **** |
| 15:00~16:00 | **** | **** | **** | **** | **** | **** |
| . | . | . | . | . | . | . |
| . | . | . | . | . | . | . |
| . | . | . | . | . | . | . |

Fig. 10

| electric energy \ time | commercial power | generated power | load power | hot water energy | virtual load power | cost merit | fuel |
|---|---|---|---|---|---|---|---|
| power consumption (kWh/month) | **** | **** | **** | **** | **** | - | - |
| unit cost of power (¥/kWh) | **** | **** | **** | **** | **** | - | - |
| monthly charge (¥/month) | **** | **** | **** | - | **** | **** | - |
| fuel consumption (m³/h) | - | - | - | - | - | - | **** |

POWER GENERATOR AND SYSTEM COMPRISING IT

This application is the U.S. National Phase under 35 U.S.C. §371 of International Application PCT/JP03/01140, filed on Feb. 4, 2003, which claims priority of Japanese Patent Application Nos. 2002-36680, 2002-36681 and 2002-36730, all filed on Feb. 14, 2002. The International Application was published under PCT Article 21(2) in a language other than English.

TECHNICAL FIELD OF THE INVENTION

The present invention relates to an electric power generator set having a generator driven by an engine and having an ability of interconnecting with an external electric power supply. Furthermore, the present invention relates to an electric power supply system comprising the electric power generator set.

BACKGROUND ART

Recently, an electric power generator set comes to be used for supplying electric power consumption apparatuses (loads) with electric power, wherein the electric power generator set can connect a circuit of electric power (internal electric power) generated by a generator driven by a private engine to an external electric power system line typically supplied by a commercial electric power supply, such as an electric power company.

An internal combustion engine, such as a gas engine or a diesel engine, is applied as the engine for driving the generator of the electric power generator set.

The electric power generator set comprises an inverter for supplying electric power to the load so as to bring the total of electric power generated by the generator and external electric power into agreement with the electric power demanded by the load. Such an electric power supply system having a system line of electric power generated by the generator in interconnection with the external electric power system line is referred to as an interconnection system.

On the other hand, recently, a cogeneration system is widely used as an application with the electric power generator set having the above-mentioned interconnection system, which recovers waste heat generated from the generator generating electric power so as to supply hot water by using the recovered heat.

The reason why the interconnection system employs the cogeneration system having both heat and electric power produced from an engine is to efficiently and economically use fuel (gas, light oil or the like) for driving the engine. Therefore, it is preferable that the system always ensures efficiency in outputting the heat and electric power to be consumed regardless of demand status thereof.

In addition, in the light of economic efficiency (energy efficiency) of the cogeneration system, it is preferable that the rate of generated electric power in the demanded electric power (load electric power) becomes large as much as possible and demand of water-heat energy is larger than water-heat energy generated by the cogeneration system.

However, the energy efficiency of the cogeneration system changes corresponding to energy consumption status of a user, so that the user must manage operation status of the cogeneration system and collects and analyzes data for calculating energy efficiency so as to grasp the optimal conditions of operation. Such complicated collection and analysis of the data prevents the user from easily and quantitatively grasping the reduction amount of energy cost (cost merit) as the benefit of introduction of the cogeneration system.

As understood from the above example of the conventional electric power supply system employing the cogeneration system, the conventional electric power supply system combines external electric power and generated electric power in efficient rate so as to supply the combined electric power, however, it is not sufficiently user-friendly because it does not clarify its usage pattern. The electric power system would be greatly satisfying for the user if it clarified the usage pattern of external electric power and generated electric power caused by it.

A well-known conventional mode of the above-mentioned electric power system is a package type electric power system having a plurality of parallel-connected electric power generator sets each of which comprises an engine, a generator, an inverter and a control unit so that each of the electric power generator sets outputs electric power via its inverter so as to input it into the external electric power.

In the package type electric power system, the control units of the respective electric power generator sets interconnect with one another so as to control output of each electric power generator set and the number of the electric power generator sets in operation, thereby controlling output of the whole package type electric power system.

With regard to output control of the whole package type electric power system, the control unit of specific one of the electric power generator sets serves as a master unit centralizing control over the other electric power generator sets (control units). The inverter in the specific one electric power generator set detects electric current from the commercial electric power system, and the control unit as the master unit controls outputs of the control units of the other electric power generator sets on the basis of detected results.

However, in the conventional electric power system of the parallel input type, only the specific electric power generator set detects the electric current from the commercial electric power system so that each of the electric power generator sets other than the specific one cannot function as the master unit because its inverter does not detect the electric current.

Therefore, the specific electric power generator set must be constantly operated to control the output on the basis of detection of current value of the commercial electric power system, thereby causing problems, such as its operation time and frequency unevenly larger than the other electric power generator sets and short period of its consumable parts. Furthermore, at the time of maintenance of the specific electric power generator set, the other electric power generator sets must be also stopped (because the other electric power generator sets cannot control output), whereby the generated electric power cannot be supplied at the time of maintenance.

SUMMARY OF THE INVENTION

According to the present invention, an electric power generator set comprises: an engine; a generator driving by the engine; and an inverter having an ability of interconnecting the generator with an external electric power supply. The electric power generator set comprises: means for detecting information concerning electric power of the external electric power supply and electric power of the electric power generator set; means for calculating electric powers of the external electric power supply and the electric power generator set, electric power to a load, and the respective electric energies; and means for registering each of the calculated electric powers and energies.

Accordingly, the electric power generator set can provide charts representing respective electric energies and the like to a user. Furthermore, the electric power generator set has image-displaying means for displaying a diagram of the respective electric energies.

Accordingly, the user of the electric power generator set can feel a glow of satisfaction at the ability of monitoring the electric energy generated by the generator and realizing the effect of his/her purchased electric power generator set.

For example, a user can compare the commercial electric energy with the generated electric energy at each established period, e.g., daily, monthly or yearly. In addition, an expense for the commercial electric power can be compared with that of the generated electric power. Therefore, the user can compare the running cost of the generated electric power with the cost for purchasing the commercial electric power so as to confirm running merit of the electric power generator set. Furthermore, the operation-and-display device calculates how long time is required for recovering cost of equipment investment of the electric power generator set on the basis of the running merit of the electric power generator set (the purchased electric power cost minus the running cost) and displays the result to the user. The respective electric powers and energies are displayed corresponding to the conceptual diagram so that the user can feel a glow of satisfaction at the ability of easily grasping power supplying pattern of the respective electric power systems and easily comparing the respective electric energies in image.

Preferably, the above-mentioned electric power generator set may comprise means for calculating fuel consumption of the engine, and image-displaying means for displaying the respective electric energies and the fuel consumption in a table. In this case, if the control unit previously stores information concerning the unit cost of fuel, a fuel cost can be calculated as the product of the fuel consumption multiplied by the unit cost. The control unit can also calculate a unit cost of electric power generated by the generator from the calculated data of generated electric power value, the data of generated electric energy calculated from the data, and the calculated data of fuel consumption. A user can feel a glow of satisfaction at the ability of grasping the unit cost of electric power of the generator on the basis of the data of his/her usage pattern of the electric power generator set.

Preferably, the above-mentioned electric power generator set may comprise means for externally transmitting the calculated result. Accordingly, data of electric powers can be transmitted to an input/output means of the control unit of the electric power generator set. If the input/output means is remote from the control unit, people at a place remote from the control unit can check the above-mentioned data (data of the electric powers) so as to manage the electric power generator set in electric power. The user can collect the data by use of the data-registering mean so as to input the data to a device which is not networked with the electric power generator set. The user at the place of the operation-and-display device can also register the above-mentioned data by use of the data-registering means so as to check change in the electric power supply and the electric energies.

If a system comprises a plurality of the above-mentioned power generator sets connected in parallel to the external electric power supply, each of the electric power generator sets preferably comprises means for controlling its own generator and inverter cooperatively, and means for detecting current value from the external electric power supply, whereby the inverters in all the electric power generator sets have abilities of detecting current value of the external electric power system. Therefore, only the electric power generator set requiring maintenance is stopped so that the other electric power generator sets can be kept in interconnection with each other without stopping, and cumulative drive times of the respective electric power generator sets can be equalized.

In the system comprising the plurality of electric power generator sets connected in parallel, a control system of each electric power generator set may preferably comprise means for communicating with the control system of the other electric power generator set, and means for making the control system serve as a master unit for centralized control over the other control system cooperatively. Therefore, only the electric power generator set requiring maintenance is stopped so that the other electric power generator sets can be kept in interconnection with each other without stopping.

In the system, the control system serving as the master unit may comprise means for accumulating information of generated electric power required of the other electric power generator set, the information being transmitted from the control system of the other electric power generator set, calculating the load electric power of the system, and determining the number of the electric power generator sets to be operated. Therefore, the equal output control and the control for operating the specific electric power generator sets with the maximum output are enabled, and the accumulated operation times of the respective electric power generator sets are equalized.

In the system, the control system serving as the master unit may comprise means for controlling the counted electric power generator sets to be operated so as to equalize outputs thereof. Accordingly, the specific electric power generator sets are prevented from excessive operation and output, thereby prolonging a life of whole electric power system.

Alternatively, the control system serving as the master unit may comprise means for controlling a specific one of the counted electric power generators so as to maximize output thereof. Accordingly, the specific electric power generator set is operated fully in output at the best performance (operate in high efficiency). Furthermore, the electric power generator sets to be rest may be selected from the electric power generator sets under operation.

The control system serving as the master unit may comprise means for recognizing operation/pause state of its own electric power generator set or the other electric power generator set and choosing the control system serving as a next master unit. Accordingly, the inverter of the electric power generator set to operate controls the other inverters as the master unit for centralized control over generated outputs of itself or the others.

The control system serving as the master unit may comprise means for shifting the electric power generator set to be operated at each predetermined period. Accordingly, operation times of the respective electric power generator sets are equalized so as to prevent the accumulative operation time of the specific electric power generator set from becoming longer than those of the other electric power generator sets, thereby prolonging a life of the whole electric power system.

The control system serving as the master unit may comprise means for preventing reverse electric power flow to the external electric power supply by cooperating with the other control system. Therefore, the master inverter controls output of itself or the other inverters, thereby preventing reverse electric power flow. A user can optionally select whether the reverse electric power flow is allowed or prevented.

Next, a modification of an electric power supply system which can supply both external electric power and generated electric power comprises waste-heat recovery means for recovering waste heat from the engine so as to generate heat. The modified system may comprise means for detecting information concerning heat energy consumed for generating hot water, means for calculating heat energy, an amount of the heat energy and energy efficiency, means for registering the calculated result, and image-displaying means for displaying the respective electric powers of the external electric power supply, the electric power generator set and load of the system, an amount of the heat energy and the energy efficiency in a table. Accordingly, various calculated data concerning the electric power values and the water-heat energy can be displayed as charts so that a user can get information concerning cost merit in no need of complicated calculation.

The system may comprise means for calculating fuel consumption for driving the engine, and image-displaying means for displaying respective electric energies, the heat energy and the fuel consumption in a table. Accordingly, the unit cost of electric power generated by the generator and the unit cost of the water-heat energy can be grasped more correctly on the basis of the actual data, whereby a user can feel a glow of satisfaction at the ability of recognizing the effect of the system.

The system may comprise means for externally transmitting the calculated result. Accordingly, a user at a place distant from the generator can monitor, analyze and register the generated electric energy by the generator and the amount of the recovered water-heat energy. Therefore, the system comprising the electric power generator set can be used more effectively, and so a user can feel a glow of satisfaction at the ability of realizing the effect of his/her purchased system comprising the electric power generator sets.

Furthermore, the system may comprise means for communication such as to enable the system to be remotely operated. Accordingly, a user need not approach the electric power generator set for changing operation pattern, whereby the cogeneration system can be used more comfortably and effectively.

The system comprising the above-mentioned electric power generator set may comprise means for detecting abnormality of the system based on the calculated result and informing concerning the abnormality, thereby enabling quick action against failure of the system. It is advantageous in safety when the user of the system comprising the electric power generator set has little knowledge of machinery. It is also advantageous in minimizing reduction of energy cost merit caused by stop of the system comprising the electric power generator set.

The system comprising the electric power generator set may comprise means for minimizing ecological load or electric power cost based on the calculated result. Therefore, a user can satisfactorily use the system comprising the electric power generator set in an optimal condition for its operation without complicated calculation.

BRIEF DESCRIPTION OF THE DRAWINGS

FIG. 2 is a comparative table displayed by the electric power generator set, representing hourly commercial electric energy and hourly generated electric energy.

FIG. 3 is a comparative table displayed by the electric power generator set, representing monthly commercial electric energy and charge and monthly generated electric energy and charge.

FIG. 9 is a comparative table displayed by the electric power generator set, representing the respective commercial, generated, and load electric energies, an amount of recovered water-heat energy, a virtual load electric power, and fuel consumption by the hour.

FIG. 10 is a comparative table displayed by the electric power generator set, representing the respective commercial, generated and load electric energies, the amount of recovered water-heat energy, the virtual load electric power, and fuel consumption by the month.

BEST MODE FOR CARRYING OUT THE INVENTION

Figure 1:
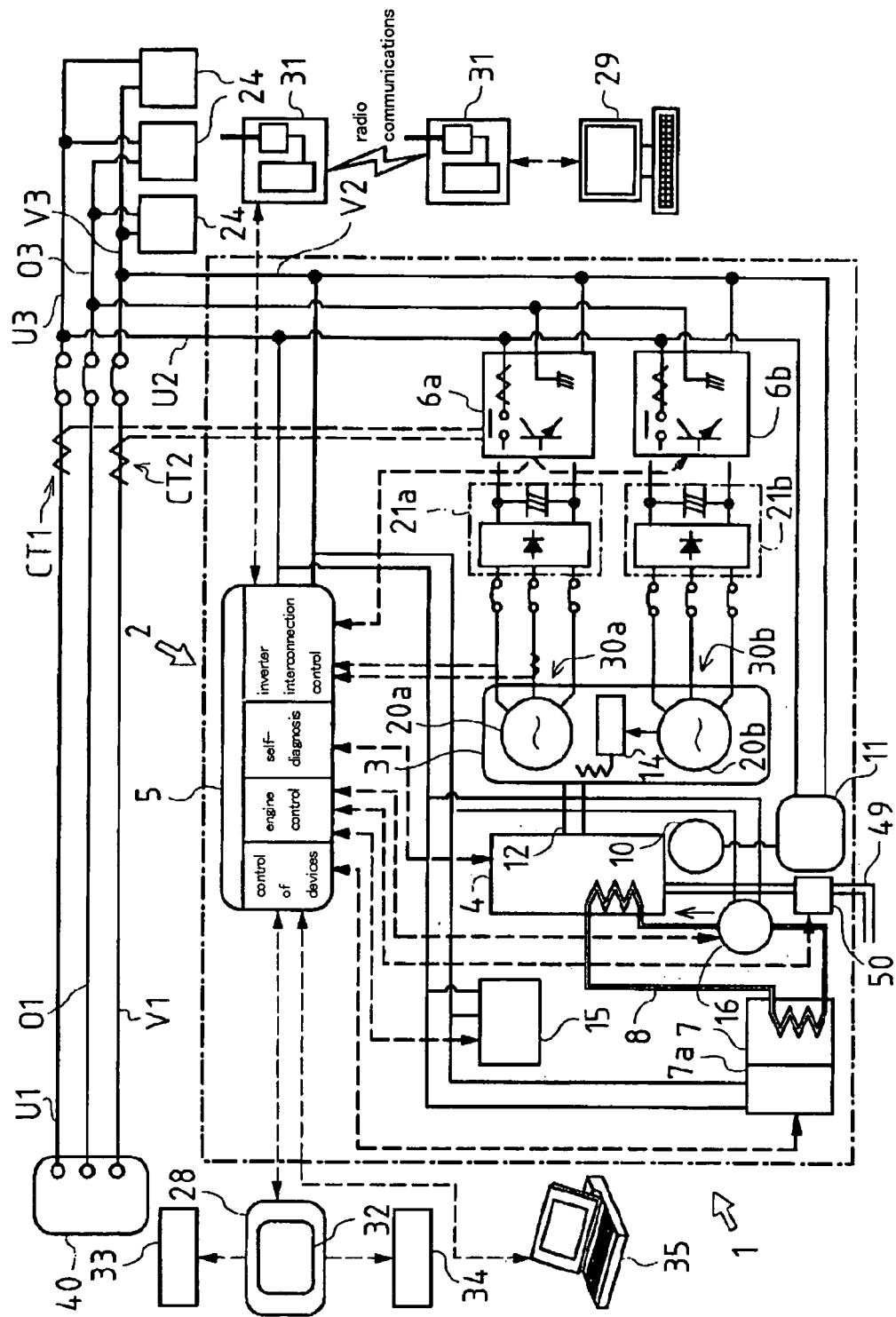
FIG. 1 is a circuit diagram of an electric power generator set according to a first embodiment of the present invention.

A mode for carrying out the invention is explained on the basis of attached drawings.

Explanation will be given on an electric power generator set 1 as an embodiment of the present invention according to FIG. 1. The present invention is applicable to any electric power generator set if it has a converter and an inverter for converting output electric power of a generator, not limited to the electric power generator set 1 of the present embodiment.

The electric power generator set 1 mainly comprises an engine 4 and a generator 3. An output side of the generator 3 is provided with converters 21a and 21b and inverters 6a and 6b, which convert output electric power of the generator 3.

A control system 2 for controlling these devices is provided in the electric power generator set 1. The control system 2 has a control unit 5 for controlling these devices and an operation-and-display unit 28 as means for input/output to the control unit 5.

In addition to the engine 4, the generator 3 and the inverters 6a and 6b, the control unit 5 controls a radiator fan 7a provided in a radiator 7, a ventilating fan 15, a cooling water pump 16 and the like.

The engine 4 is an internal-combustion engine and disposed in a machinery room (not shown).

Liquid fuel, such as light oil, kerosene or heavy oil, or gaseous fuel, such as natural gas, town gas or sewage digestion gas, can be used as fuel for the engine 4, and the fuel is supplied to the engine 4 from an external fuel tank or an infrastructure (not shown) through a fuel supply piping 49. A fuel flowmeter 50 is disposed in the fuel supply piping 49 and detects data concerning fuel consumption of the engine 4 so as to transmit the data to the control system 2. The data are taken into account with a unit cost of fuel so as to compute a unit cost of generated electric power in each time zone and an average unit cost of the generated electric power in a predetermined period. With regard to the present embodiment, detection of flux is used as a method for detecting fuel consumption. However, the method is not limited thereto. Detection of change of weight of a tank at the time of supplying fuel to the tank or the like also is considerable as the method.

The radiator 7 of the engine 4 is disposed in a heat exchanger chamber (not shown). The ventilating fan 15 introduces outside air and ventilates the machinery room and the heat exchanger chamber so as to cool air in the chambers.

A primary cooling water passage 8 is formed in the electric power generator set 1 so as to circulate cooling water of the engine 4 through the radiator 7. The radiator fan 7a is provided in the radiator 7 and drives so as to cool the cooling water passing through the radiator 7.

A starter 10 is disposed in the engine 4, and electric power is supplied to the starter 10 from later-discussed load electric power lines U3 and V3 (including generated electric power lines U2 and V2) through a transformer 11. Otherwise, electric power may be supplied to the starter 10 from a battery.

The generator 3 has a rotor (not shown), which has a field winding excited by a direct-current electric power supply, on a rotation shaft 12 connected to a drive shaft of the engine 4, and three-phase output is taken out by armatures disposed on a stator (not shown). The generator 3 has armature windings 20a and 20b constituting the two-winding armature for outputting the three-phase electric power. Either shunt winding type or tandem type is suitable for arrangement of the armature windings 20a and 20b.

Electromagnetic induction is generated by rotation of the above-mentioned field winding (rotor) so as to generate voltage on the armature windings 20a and 20b respectively. Three output terminals are provided on each of the armature windings 20a and 20b, whereby three-phase electric power is outputted from the armature windings 20a and 20b.

The generator 3 is constructed to be revolving-field type such that the field winding is disposed on the rotor, and the armatures on the stator. Alternatively, it may be revolving-armature type such that armatures are disposed on a rotor, and a field winding on a stator, or that a rotor is disposed on a permanent magnet, and armatures on a stator.

The generator 3 has an automatic voltage regulator (hereinafter, referred to as AVR) 14 so as to control supply electric power to the above-mentioned field winding. The AVR 14 regulates the size of the magnetic field excited by the field winding so as to uniform the voltage value outputted from the armature windings 20a and 20b.

Each of the three-phase outputs 30a and 30b from the generator 3 is rectified and smoothed by each of the converters 21a and 21b which convert AC to DC, and after that, connected to direct-current input parts of the inverters 6a and 6b. Then, the generated electric power lines U2 and V2 as output lines from the inverters 6a and 6b are interconnected with lines of a later-discussed external electric power (in this embodiment, commercial electric power supplied from an electric power company or the like) system.

A commercial electric power system to be interconnected with the electric power generator set 1 is not limited to that of a single-phase three-wire type as shown in the embodiment of FIG. 1. Alternatively, a three-phase one-wire commercial electric power system may be used for interconnection with the electric power generator set 1.

Lines U1, O1 and V1 of 200V single-phase three-wire type commercial electric power system are drawn from a commercial electric power supply 40 serving as an external electric power supply. The potential difference of 200V exists between the commercial electric power system lines U1 and V1, and the commercial electric power system line O1 is a neutral line, whereby between the commercial electric power systems U1 and O1 and between the commercial electric power systems O1 and V1 are generated the potential difference of 100V.

The commercial electric power system lines U1 and V1 are connected in parallel with the respective generated electric power system lines U2 and V2 from the electric power generator set 1. The invertors 6a and 6b also generates a potential difference of 200V between the generated electric power system lines U2 and V2, so as to correspond to that between the commercial electric power systems U1 and V1, thereby ensuring the interconnection for supplying electric power from the commercial electric power system lines U1, V1 to the generated electric power system lines U2 and V2.

Load electric power interconnected as the above (load electric power system lines U3, O3 and V3) is supplied to electric power-consuming instruments (hereinafter, referred to as single-phase loads) 24.

Current transformers CT1 and CT2 are provided on the respective commercial electric power system lines U1 and V1 so that the inverter 6a detects current value of the commercial electric power supplied to the single-phase load 24 through the commercial electric power system lines U1 and V1.

The current value of the commercial electric power system lines U1 and V1 is changed corresponding to electric power consumption of the single-phase loads 24. Therefore, the invertors 6a and 6b uniform the generated electric power (load electric power) so as to stably supply the load electric power to the single-phase loads 24.

In this way, the generated electric power system lines U2 and V2 are supplied with suitable generated electric power from the inverters 6a and 6b in correspondence to the current value of the commercial electric power system lines U1 and V1 detected by the current transformers CT1 and CT2.

A plurality of (two in the present embodiment) inverters 6a and 6b are networked with each other by multidrop. The inverter 6a calculates a required set output (electric power) value on the basis of the detected current value of the commercial electric power system lines U1 and V1. Then, the inverter 6a transmits the set output value to the other inverter 6b. The inverter 6b controls output so as to adjust it to the transmitted set output value.

Hereafter, explanation will be given on an example of actuation of the electric power generator set 1 by the above-mentioned interconnection.

(1) When Electric Power Consumption of the Single-Phase Loads Increases:

As demand electric power of the load electric power system lines U3, O3 and V3 increases, the commercial electric power flowing in the commercial electric power system lines U1, O1 and V1 increases. The "load electric power system lines" mean the commercial electric power system lines interconnected with the generated electric power system lines.

Increment of the commercial electric power in the commercial electric power system lines U1 and V1 is calculated as a product of increment of the current value detected by the current transformers CT1 and CT2 multiplied by the detected voltage in the output part of the inverter 6a. Corresponding to this, the inverter 6a controls itself so as to increase the generated electric power to the generated electric power system lines U2 and V2, and controls the inverter 6b.

(2) When Electric Power Consumption of the Single-Phase Loads Decreases:

As the demand electric power of the load electric power system lines U3, O3 and V3 decreases, the commercial electric power flowing in the commercial electric power system lines U1, O1 and V1 decreases.

Decrement of the commercial electric power in the commercial electric power system lines U1 and V1 is calculated as a product of increment of the current value detected by the current transformers CT1 and CT2 multiplied by the detected voltage in the output part of the inverter 6a. Corresponding to this, the inverter 6a controls itself so as to decrease the generated electric power to the generated electric power system lines U2 and V2, and controls the inverter 6b.

Explanation will now be given on a electric power control system using the control system 2.

In addition to serving as a control mechanism of the electric power generator set 1, the control system 2 functions as a electric power control system for controlling electric power, such as the generated electric power and the load electric power.

The control unit 5 of the control system 2 controls drive of devices constituting the electric power generator set 1, and calculates and stores electric power value and value of electric energy of each electric power system. The control unit 5 has a memory as a storage means, and a computing unit (CPU) as a calculation means.

Data concerning electric power directly detected for the electric power generator set 1 include a current value of the commercial electric power, and a current value and a voltage value of the generated electric power.

As mentioned above, the inverter 6a can detect the current value of the commercial electric power through the current transformers CT1 and CT2. The inverter 6 transmits the detected data concerning the commercial electric power to the control unit 5, and the control unit 5 stores the data.

The inverters 6a and 6b use respective circuits therein to detect the current value and voltage value of the generated electric power converted and outputted by the inverters 6a and 6b. Then, the detected data concerning the generated electric power are also transmitted to and stored by the control unit 5.

Next, explanation will be given on data calculated based on the detected data.

The commercial electric power of the commercial electric power system lines U1 and V1 and the generated electric power of the generated electric power system lines U2 and V2 are combined into the load electric power of the load electric power system lines U3 and V3. The computing unit in the control unit 5 calculates a value of the load electric power on the basis of the detected data concerning the commercial electric power and the generated electric power.

The control unit 5 stores the calculated data concerning the load electric power value.

The control unit 5 calculates each electric energy by detection and calculation of the data concerning each electric power. Each electric energy is obtained by time integration of the corresponding electric power. In the present embodiment, the control unit 5 calculates electric energies supplied to the loads every a fixed time (one hour, in the present embodiment).

In this way, the control unit 5 calculates a commercial electric energy and a generated electric energy on the basis of the calculated values concerning the commercial electric power and the generated electric power, respectively, and a load electric energy is calculated on the basis of the calculated value of the load electric power.

The control unit 5 stores these calculated data concerning the respective electric energies.

Summarizing the above, the data concerning the commercial electric power value and the generated electric power value detected by the inverter 6a are transmitted to and stored by the control unit 5. In the present embodiment, the data concerning the commercial electric power value is represented by the data of the detected current value of the commercial electric power, and the data concerning the generated electric power value is represented by the data of the detected current value and voltage value of the generated electric power.

The control unit 5 calculates data of the respective electric power values and data of the respective electric energies, and also storages them. In the present embodiment, the data of the electric power values are data of the commercial electric power value, generated electric power value and load electric power value. The data of the respective electric energies are data of the commercial electric energy, generated electric energy and load electric energy.

As mentioned above, the electric power generator set 1 can be interconnected with the external electric power supply (commercial electric power supply) by the inverters 6a and 6b, and the electric power generator set 1 comprises: means for detecting information concerning respective electric powers of the external electric power supply and the electric power generator set 1; means for calculating the respective electric powers and electric energies of the external electric power supply, the electric power generator set and the loads; and means for storing the calculated electric powers and electric energies.

The information concerning the respective electric powers of the external electric power supply (commercial electric power supply 40) and the electric power generator set 1 is data concerning their current values and voltage value, and the means for detecting this information comprises the inverters 6a and 6b.

The means for storing each electric power and energy comprises the control unit 5.

Accordingly, the entire electric power generator set can be miniaturized compared with a electric power generator set constituted by attaching an inverter for interconnection to an existing generator unit mainly comprising the engine 4 and the generator 3.

The electric power control system comprising the inverters 6a and 6b for interconnection and the control unit 5 are integrated into the electric power generator set 1 so that there is no necessity of adding a new device, whereby cost is reduced and an additional space for providing the additional device is not required.

The operation-and-display unit 28 serving as an element of the electric power generator set 1 is input/output means, which serves as not only input means for transmitting commands to the control unit 5 but also output means for receiving data transmitted from the control unit 5.

The control unit 5 is provided with an output terminal for transmitting data, and as shown in FIG. 1, the operation-and-display unit 28 serving as the input/output means is networked to the control unit 5 through a signal wire system. Alternatively, the operation-and-display unit 28 may be constructed as a remote control board in radio communication with the control unit 5.

Instead of the operation-and-display unit 28 or in addition thereto, a widely used general-purpose personal computer 35 can be used as input/output means.

The electric power generator set 1 and a remote monitoring system (central remote monitoring center) remotely provided from the electric power generator set 1 comprise respective communication adapters 31 so as to connect the control unit 5 of the electric power generator set 1 to an supervisory operation-and-display unit 29 of the remote monitoring system. The adapters 31 enable two-way communication between the control unit 5 and the supervisory operation-and-display unit 29, that is, between an installation place of the electric power generator set 1 and a remote place therefrom.

On the contrary to the operation-and-display unit 28 provided within the electric power generator set 1, the supervisory operation-and-display unit 29 is an example as an operation-and-display device disposed outside the electric power generator set 1.

The communication means between the control unit 5 and the supervisory operation-and-display unit 29 is not limited to radio communication, and it may be wired communication using a communication line such as a telephone line.

Accordingly, due to the electric power generator set 1 having the operation-and-display unit 28 and the means for external transmitting the calculated results (the output terminal, the communication adapters 31 and the like), the data concerning electric powers, such as the above detected data and calculated data, stored in the control unit 5 of the electric power generator set 1 can be checked and managed at a place remote from the electric power generator set 1.

In the present embodiment, the centralized control unit 5 can transmit data to both the operation-and-display devices 28 and 29. Alternatively, the centralized control unit 5 may be able to transmit data to only one of them.

The electric power generator set 1 has image-displaying means for displaying graphs of the respective electric energies, i.e., a display 32 provided in the operation-and-display unit 28. Explanation will be given on charts displayed on the display 32 as follows with reference to FIGS. 2 to 7, which may be applied to the supervisory operation-and-display unit 29 (or the personal computer 35).

The operation-and-display unit 28 serving as the input/output means has the display 32 for displaying diagrams of data, which are diagrammatized by a processing program stored in the operation-and-display unit 28.

In the present embodiment, the current transformers CT1 and CT2 detect the current of the commercial electric power from the commercial electric power supply 40, and circuits in the inverters 6a and 6b detect the current and voltage of the generated electric power from the generator 3. However, means for detection thereof are not limited to the above.

The control unit 5 processes the detected data concerning the commercial electric power and the generated electric power so as to calculate data concerning electric power value and electric energy for the loads. However, means for calculation thereof is not limited to the control unit 5. For example, the operation-and-display unit 28 serving as the input/output means may receive the detected data and calculate by use of a computer and processing program stored therein.

Firstly, a comparative table about the hourly commercial and generated electric energies shown in FIG. 2 will be described.

According to the above-mentioned processing program, the display 32 displays a table in which the calculated commercial electric energy, generated electric energy and load electric energy every hour are lined up by the hour. In the present embodiment, as mentioned above, since each of the electric energies is calculated every hour, each of the calculated electric energies is listed hour by hour in the list.

Currently, each of the electric energies means the electric energy of each of the external electric power supply, the electric power generator set and the loads. The display 32 serves as the image-displaying means.

Accordingly, a user of the electric power generator set 1 can feel a glow of satisfaction at its ability of monitoring the electric energy generated by the generator 3 and realizing the effect of his/her purchased electric power generator set 1.

Next, a comparative table about the monthly commercial and generated electric energies and electric charges shown in FIG. 3 will be described.

According to the above-mentioned processing program, the above-mentioned calculated data, i.e., the hourly commercial electric energy, generated electric energy and load electric energy can be totaled at each monthly period so as to calculate respective monthly electric energies, and the display 32 can display a list of the monthly electric energies and corresponding electric charges.

The operation-and-display unit 28 previously memorizes a unit cost of the commercial electric power per kWh (purchased electric power cost) shown in FIG. 3 informed by the commercial energy supplier (electric power company). The control unit 5 calculates a unit cost of the generated electric power per kWh on the basis of the cost of fuel required for driving the engine 4, and corresponding to increase/decrease of fuel consumption.

The unit cost per kWh and charge of the generated energy means a running cost of the electric power generator set 1.

According to the above construction, a user can compare the commercial electric energy with the generated electric energy every month. Furthermore, the user can also compare the charge of the commercial electric power with that of the generated electric power. Therefore, the user can compare the running cost of the generated electric power with the purchase cost of the commercial electric power so as to confirm a running merit of the electric power generator set 1.

The case of comparison every month is shown in the embodiment in FIG. 3. Alternatively, the comparison may be done every day or every year.

Further, the operation-and-display unit 28 can calculate how long time is required to recover the capital spending of the electric power generator set 1 on the basis of the running merit of the electric power generator set 1 (the purchasing electric power cost minus the running cost) so that the user can monitor it.

With regard to the above construction, the electric power generator set comprises calculation means for calculating fuel consumption of the engine and image-displaying means for displaying each of the electric energies and the fuel consumption in a table.

Currently, each of the electric energies means electric energy of each of the external electric power supply, the electric power generator set and the loads. The control unit 5 serves as the calculation means is the control unit 5, and the display 32 serves as the image-displaying means.

Accordingly, the fuel flowmeter 50 detects data concerning the fuel consumption of the engine 4 and transmits the data to the control unit 5 of the electric power generator set 1, and the control unit 5 can calculate a fuel cost (¥/month or ¥/hour), i.e., a product of the data multiplied by the known unit cost of fuel (¥/m$^3$ or ¥/litter) which has been already inputted into the control unit 5.

The control unit 5 can also calculate a unit cost of the electric power generated by the generator 3 from the calculated data of the generated electric power value, the data of the generated electric energy calculated from the data generated electric power value, and the calculated data of fuel consumption. A user can feel a glow of satisfaction at the ability of grasping the unit cost of the electric power of the generator 3 on the basis of the actual data representing his/her working conditions of the electric power generator set.

Figure 4:
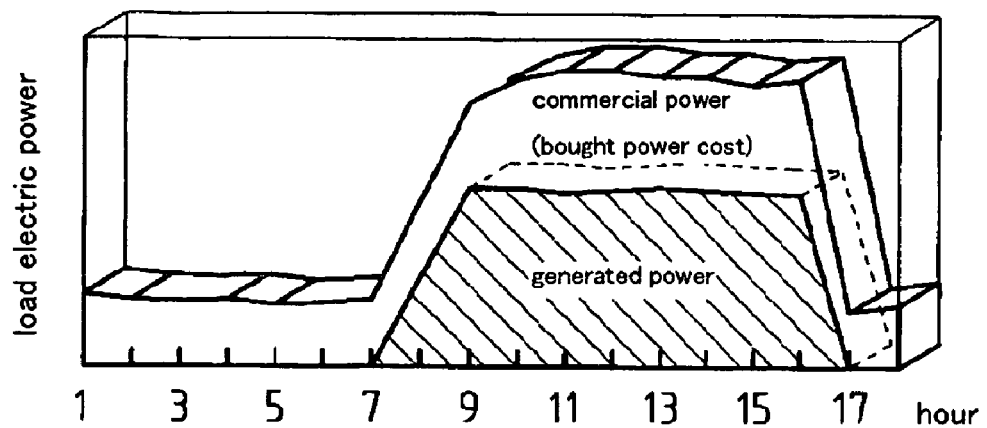
FIG. 4 is a comparative graph displayed by the electric power generator set, representing the hourly commercial electric energy and the hourly generated electric energy.

A graph of FIG. 4 representing hourly comparison of the commercial and generated electric energies will now be described.

The graph of FIG. 4 is made by graphing the comparative table in FIG. 2. The axis of abscissas designates hour-by-hour passage of time, and the axis of ordinates designates variations of the respective electric energies.

Due to the above construction, a user can compare the electric energies supplied by the respective electric power systems with each other every hour, so as to know in which hour the load electric power increases or decreases in a day, and to know what is the best electric power generating pattern for cost reduction corresponding to items of his/her contract with the electric power company. Therefore, the user can recognize the effect of his/her investment for equipment of the electric power generator set 1.

Figure 5:
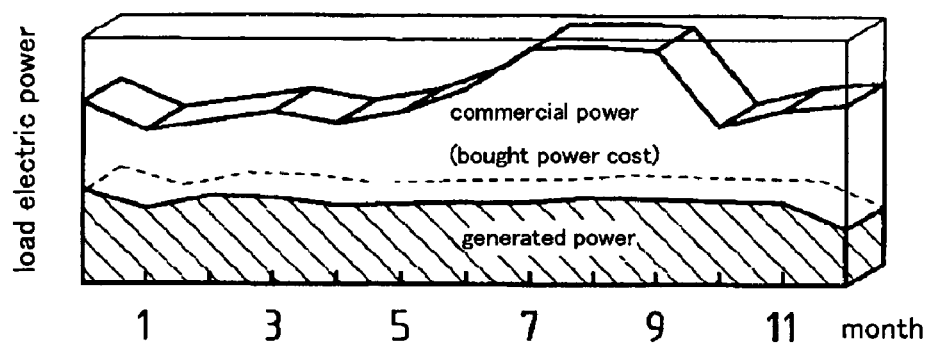
FIG. 5 is a comparative graph displayed by the electric power generator set, representing the monthly commercial electric energy and the monthly generated electric energy.

A graph of FIG. 5 representing comparison of the monthly commercial and generated electric energies will be described.

The graph of FIG. 5 represents the monthly comparison of the commercial and generated electric energies and variation of the load electric energy. The axis of abscissas designates month-by-month passage of time, and the axis of ordinates designates variation of the respective electric energies.

According to the above construction, a user can compare the electric energies supplied by the respective electric power systems with each other every month, so as to know in which month the load electric power increases or decreases in a year, and to know what is the best electric power generating pattern for cost reduction corresponding to items of his/her contract with the electric power company. Therefore, The user can recognize the effect of his/her investment for equipment of the electric power generator set 1.

Figure 6:
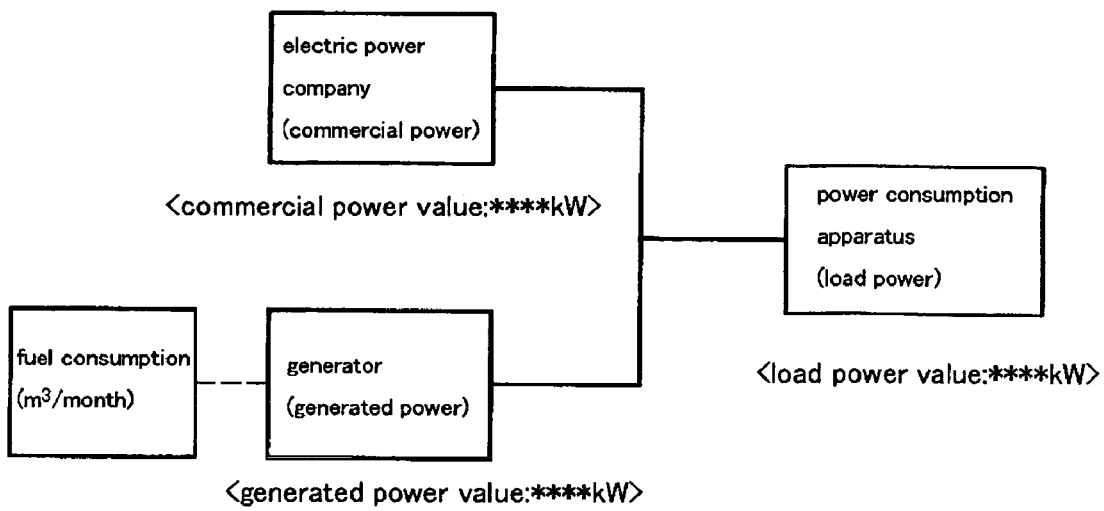
FIG. 6 is a conceptual diagram displayed by the electric power generator set, representing the electric power systems with the supplied electric power values corresponding to the respective electric power systems.

A conceptual diagram of electric power system shown in FIG. 6 representing electric power values currently supplied by the respective electric power systems will be described.

According to the above-mentioned processing program, the display 32 displays the conceptual diagram of the electric power systems, on which electric power values supplied by the respective electric power systems can be displayed corresponding to the respective electric power systems. The electric power values and fuel consumption displayed on the display 32 are the above-mentioned detected data and calculated data, and updated at each period of detection of the commercial current value, generated current value and generated electric power value by the inverter 6a. Namely, change of each electric power value is displayed on the display 32 in real time.

According to the above construction, a user can feel a glow of satisfaction at the ability of checking momentarily change of the electric powers supplied by the respective electric power systems, and at the ability of easily grasping variation of the supplied electric powers in image because the supplied electric power values are displayed corresponding to the conceptual diagram.

Figure 7:
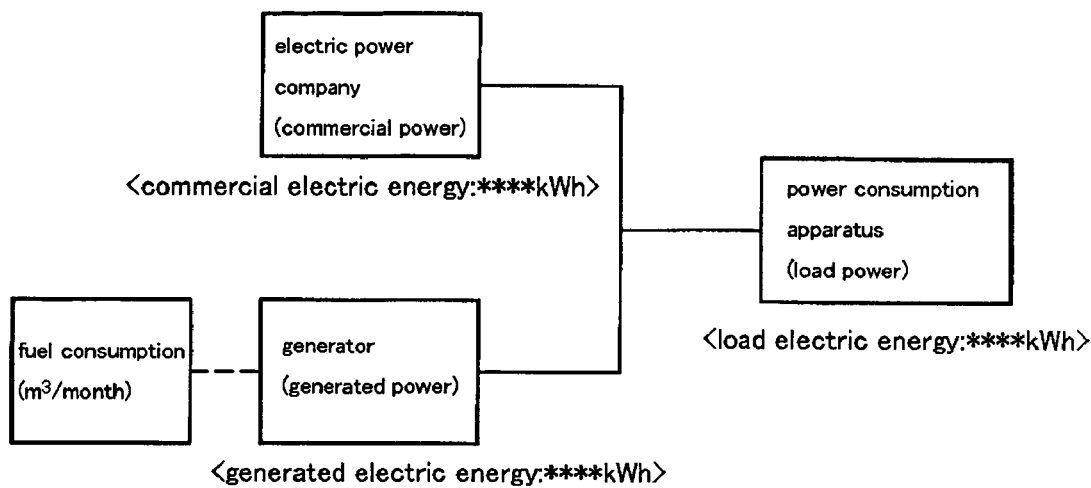
FIG. 7 is a conceptual diagram displayed by the electric power generator set, representing the electric power systems with the monthly supplied electric energies corresponding to the respective electric power systems.

A conceptual diagram of electric power system shown in FIG. 7 representing electric energies monthly supplied by the respective electric power systems will be described.

According to the above-mentioned processing program, the display 32 displays the conceptual diagram of the electric power systems, on which the monthly electric energies supplied by the respective electric power systems and the monthly fuel consumption can be displayed corresponding to the respective electric power systems. Each of the monthly electric energies is the monthly total of the calculated data of the corresponding hourly electric energies, similarly to the comparative table of FIG. 3 representing the monthly electric energies and charges of the respective commercial and generated electric powers.

Due to the above construction, a user can feel a glow of satisfaction at the ability of checking the monthly electric energies supplied by the respective electric power systems, and at the ability of easily grasping comparison of the monthly electric energies in image because the supplied electric energies are displayed corresponding to the conceptual diagram.

The period of the comparison is not limited to each month, and it may be each day or each year.

The operation-and-display unit 28 serving as the input/output means of the control unit 5 can be used as output means for taking out each of the above-mentioned data from the electric power generator set 1.

In this regard, the operation-and-display unit 28 has a mechanism for outputting to an IC card (card-like device) 33 serving as data-storage means, and a mechanism for outputting to a printer 34 serving as data-registering means. Therefore, each of the above-mentioned data can be memorized in the IC card 33, and numerical information of each of the above-mentioned data and the above-mentioned diagrams (such as FIGS. 2 to 7) can be printed by the printer 34.

Due to the above construction, each of the above-mentioned data can be collected by the IC card 33 so as to be read by a device which is not networked with the electric power generator set 1. Especially if a computer reads the data from the IC card 33 and the computer stores a data processing program different from those stored in the control unit 5 and operation-and-display unit 28, the data processing can enhance variation of electric power management.

The printer 34 can print the numerical information of each of the above-mentioned data and the above-mentioned diagrams. Namely, due to each of the above-mentioned data registered by the data-registering means, the user can check change of electric power supply and electric energy at the place of the operation-and-display unit 28. Especially in the case of providing the printer 34, the printer 34 can serve as main means for checking the data and diagrams thereof, whereby a small liquid crystal display, for example, can be used as the display 32 so as to reduce costs thereof.

Figure 8:
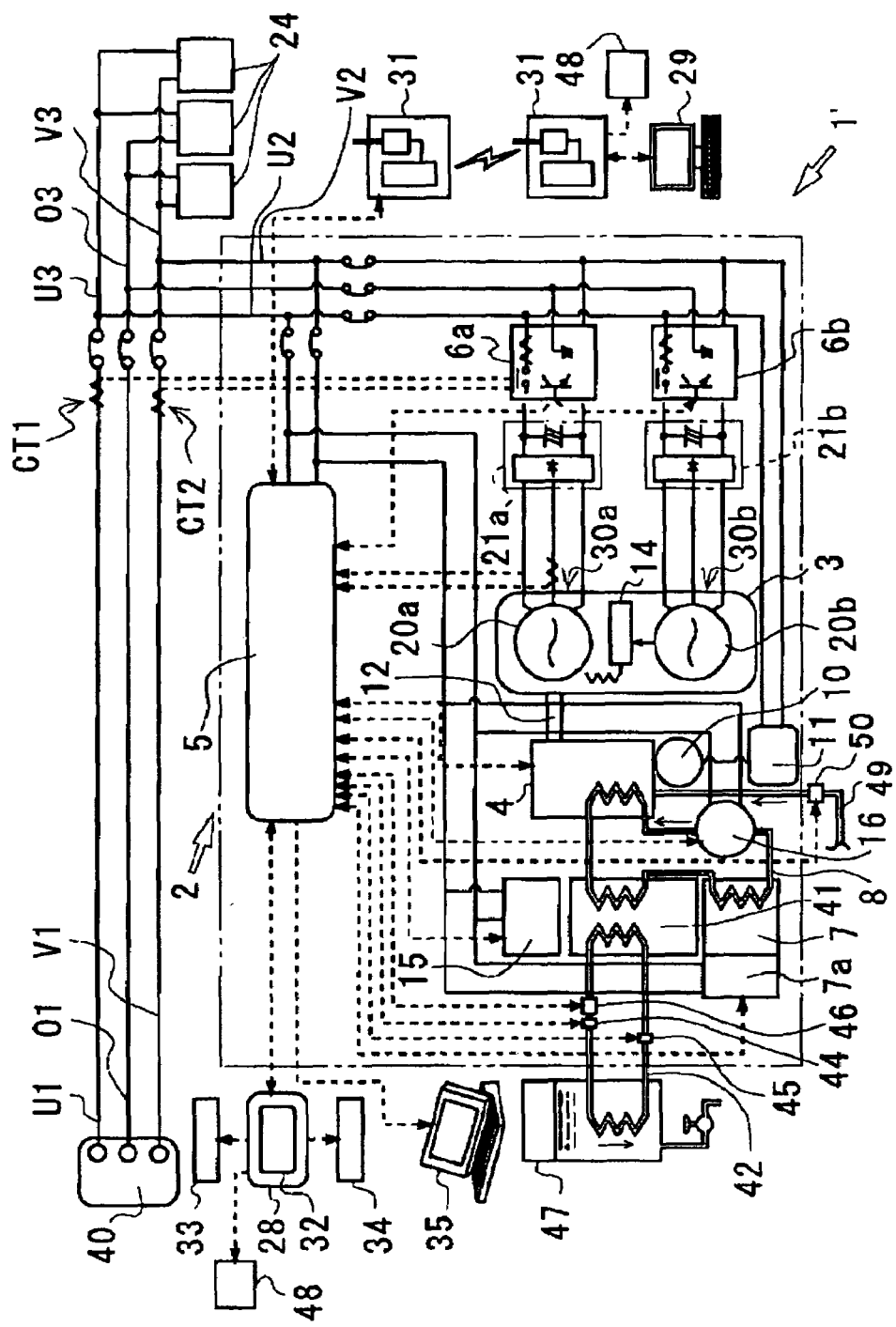
FIG. 8 is a circuit diagram of an electric power generator set according to a second embodiment of the present invention.

Next, a cogeneration system as a second embodiment of the electric power supply system concerning the present invention will be described in accordance with FIG. 8.

A electric power generator set 1' of the second embodiment mainly comprises an engine 4 and a generator 3, and also comprises a control system 2 for controlling these devices. The control system 2 has a control unit 5 for controlling these devices and an operation-and-display unit 28 as means for input/output to the control unit 5. The electric power generator set 1' has a water-heat energy recovery mechanism.

The electric power generator set 1' of the second embodiment has the same engine 4 and generator 3 and the same interconnection with a commercial electric power supply 40 serving as an external electric power supply via inverters 6a and 6b as those of the electric power generator set 1 of the first embodiment.

Explanation will be given on the water-heat energy recovery mechanism of the electric power generator set 1'. The water-heat energy recovery mechanism is the general term representing a primary cooling water passage 8, a cooling water pump 16, a heat exchanger 41, a secondary cooling water passage 42, an entrance side thermometer 44, an exit side thermometer 45, a flowmeter 46, a hot water storage tank 47 and so on.

The energy recovery mechanism and a generation unit of the electric power generator set 1' constitute the cogeneration system serving as the system using a generator according to the present invention. With regard to this system, the energy recovery mechanism functions as means for recovering waste heat of the electric power generator set.

The electric power generator set 1' comprises the primary cooling water passage 8 in which primary cooling water is circulated through the heat exchanged 41 and the radiator 7 by the cooling water pump 16. The radiator 7 comprises a radiator fan 7a, which drives to cool the primary cooling water circulating in the radiator 7.

The secondary cooling water passage 42 is provided in the heat exchanger 41, and heat energy of the primary cooling water is conducted to secondary cooling water by heat conduction. A circulating pump (not shown) circulates the secondary cooling water in the secondary cooling water passage 42. A part of the secondary cooling water is drawn into the hot water storage tank 47 and contacts water stored in the hot water storage tank 47 so that heat energy of the secondary cooling water is conducted to the water in the hot water storage tank 47 by heat conduction. Accordingly, waste heat of the engine 4 raises the temperature of the water in the hot water storage tank 47 so as to make the water into hot water, whereby the heat is recovered as water-heat energy.

The entrance side thermometer 44 and the exit side thermometer 45 are disposed at entrance side and exit side of the hot water storage tank in the secondary cooling water passage 42 respectively and the flowmeter 46 is disposed at the entrance side or the exit side of the secondary cooling water passage 42 so as to quantitatively grasp how much waste heat generated in the engine 4 is recovered.

In the present embodiment, the energy of waste heat of the engine 4 is recovered for the energy of hot water in the hot water storage tank 47 through the primary cooling water and the secondary cooling water. Alternatively, the primary cooling water passage 8 may be directly passed through the hot water storage tank 47 so as to recover heat from the primary cooling water to the hot water storage tank 47.

Cooling of the primary cooling water by the radiator 7 and the radiator fan 7a is essentially unnecessary for maximizing the energy efficiency because the cooling means waste of the heat of the engine 4 from the electric power generator set 1'. However, in use of the generator, when demand (used amount) of the water-heat energy is extremely less than demand of electric energy (the load electric energy), waste heat of the engine 4 cannot be recovered completely and the temperature of the primary cooling water is raised so that the engine 4 may be troubled. The radiator 7 and the radiator fan 7a are provided for safety supposing such a situation.

Explanation will now be given on a electric power control system using the control system 2.

In addition to serving as the mechanism for controlling the electric power generator set 1, the control system 2 functions as a electric power control system which controls electric power, such as the generated electric power and the load electric power, and the water-heat energy obtained by recovering waste heat generated from the engine 4.

The control unit 5 of the control system 2 controls drive of each device constituting the electric power generator set 1', and can calculate and store electric power value (kW) and electric energy value (kWh) of each electric power system, the water-heat energy (kW) and the amount of recovered water-heat energy (kWh). The control unit 5 has a memory as storage means and a computer (CPU) as calculation means.

The electric power generator set 1' has two directly detected values concerning electric powers, i.e., a current value of the commercial electric power and a current value of the generated electric power.

As mentioned above, the inverter 6a can detect the current value of the commercial electric power (A) via the current transformers CT1 and CT2. The inverter 6a transmits the detected data concerning the commercial electric power to the control unit 5, and the control unit 5 stores the data.

The inverters 6a and 6b use their circuits for detecting the current value of the generated electric power (A), which is converted and outputted by the inverters 6a and 6b. The detected data concerning the generated electric power are also transmitted to and stored by the control unit 5.

The electric power generator set 1' has three directly detected values concerning water-heat energy, i.e., an entrance side temperature and an exit side temperature of the secondary cooling water in the heat water storage tank, and a flux in the secondary cooling water passage. Namely, the entrance side thermometer 44 and the exit side thermometer 45 are disposed at entrance side and exit side of the hot water storage tank in the secondary cooling water passage 42 respectively so as to detect an entrance side temperature T1 (° C) and an exit side temperature T2 (° C) of the secondary cooling water. The flowmeter 46 is disposed at the entrance side or the exit side of the secondary cooling water passage 42 so as to detect a flux L (litter/second) of the secondary cooling water. The detected data are transmitted to and stored in the control unit 5. The flowmeter 46 may be omitted due to the characteristic of the circulating pump (not shown), or provided for inputting of flux.

Next, explanation will be given on data concerning electric power calculated from the above-mentioned detected data.

The commercial electric power of the commercial electric power system lines U1 and V1 and the generated electric power of the generated electric power system lines U2 and V2 are combined into the load electric power of the load electric power system lines U3 and V3. The control unit 5 calculates a value of the load electric power on the basis of the detected data concerning the commercial electric power and the generated electric power by its computer.

The control unit 5 stores the calculated data concerning the load electric power value.

The control unit 5 calculates each electric energy by detection and calculation of the data concerning each electric power. Electric energy (kWh) is obtained by time integration of electric power (kW). In the present embodiment, the control unit 5 calculates the electric energy supplied to loads for an established time (an hour in the present embodiment) at each of the established periods.

Then, the control unit 5 calculates commercial electric energy and the generated electric energy on the basis of calculated commercial electric power value and generated electric power value, thereby calculating load electric energy on the basis of the calculated load electric power value.

The control unit 5 stores the calculated data concerning the electric energy.

Next, explanation will be given on data concerning the water-heat energy calculated from the above-mentioned detected data.

The detected data, i.e., the entrance side temperature T1 (° C.), the exit side temperature T2 (° C.) and the flux L (litter/second) of the secondary cooling water, are processed with a constant, i.e., specific heat of water $K(kJ/litter*° C.)$, according to a formula $K*(T1-T2)*L$ so as to calculate an energy per unit time (kW=kJ/second) of hot water recovered into the hot water storage tank 47. An amount of recovered water-heat energy (kWh) is obtained by time integration of the water-heat energy per unit time (kW).

Summarizing the above, the control unit 5 receives and stores data detected by the inverter 6a concerning the commercial electric power value and generated electric power value. The control unit 5 calculates the load electric power value, commercial electric energy, the generated electric energy and load electric energy from the above-mentioned detected data, and stores the calculated data.

Also, the control unit 5 receives and stores data detected by the entrance side thermometer 44, the exit side thermometer 45 and the flowmeter 46 concerning the water-heat energy. The control unit 5 calculates the water-heat energy and the amount of recovered water-heat energy from the above-mentioned detected data, and stores the calculated data.

Further, it is possible that the control unit 5 having known the unit cost of fuel ($¥/m^3$ or ¥/litter) receives data detected by the fuel flowmeter 50 concerning fuel consumption of the engine 4 and calculates a fuel cost (¥/month or ¥/hour) as the product of the detected data multiplied by the unit cost.

As mentioned above, the system using the electric power generator set 1' comprises: means for detecting data concerning heat energy spent for producing hot water; means for calculating the heat energy, the amount of the heat energy and the efficiency of the energy; and means for storing the calculated results.

Currently, the system using the electric power generator set 1' means the cogeneration system. The entrance side thermometer 44, exit side thermometer 45 and flowmeter 46 serve as the means for detecting data concerning heat energy spent for producing hot water. The control unit 5 serves as the means for calculating the heat energy, the amount of the heat energy and the efficiency of the energy, and the means for storing the calculated results.

Compared with a cogeneration system constituted by attaching a heat recovery system and a control system to an existing generator unit mainly comprising the engine 4 and the generator 3, the whole electric power generator set 1' can be appropriately reduced in size (and space).

The electric power generator set 1' integrally comprises the inverters 6a and 6b for interconnection and the water-heat energy recovery mechanism, and comprises the control unit 5 for collectively controlling each device of the electric power generator set 1', thereby requiring no additional device for controlling electric power and heat energy thereof, and saving costs and a space for such an additional device.

The operation-and-display unit 28 serving as an element of the electric power generator set 1' is input/output means, which serves as not only input means for transmitting commands to the control unit 5 but also output means for receiving data transmitted from the control unit 5.

The control unit 5 is provided with an output terminal for data communication, and as shown in FIG. 1, the operation-and-display unit 28 serving as the input/output means is networked to the control unit 5 through a signal wire system. Alternatively, the operation-and-display unit 28 may be a remote control board in radio communication with the control unit 5.

Instead of the operation-and-display unit 28 or in addition thereto, a widely used general-purpose personal computer 35 may be used as the input/output means.

The electric power generator set 1 and a remote monitoring system (central remote monitoring center) remotely provided from the electric power generator set 1' comprise respective communication adapters 31 so as to connect the control unit 5 of the electric power generator set 1 to an supervisory operation-and-display unit 29 of the remote monitoring system. The adapters 31 enable two-way communication between the control unit 5 and the supervisory operation-and-display unit 29, that is, between an installation place of the electric power generator set 1 and a remote place therefrom.

On the contrary to the operation-and-display unit 28 provided within the electric power generator set 1', the supervisory operation-and-display unit 29 is an example as an operation-and-display device disposed outside the electric power generator set 1'.

The communication means between the control unit 5 and the supervisory operation-and-display unit 29 is not limited to radio communication, and it may be wired communication using a communication line such as a telephone line.

In the present embodiment, the centralized control unit 5 can transmit data to both the operation-and-display devices 28 and 29. Alternatively, the centralized control unit 5 may be able to transmit data to only one of them.

Accordingly, due to the electric power generator set 1' having the operation-and-display unit 28 and the means for external transmitting the calculated results (the output terminal, the communication adapters 31 and the like), the data concerning electric powers, such as the above detected data and calculated data, stored in the control unit 5 of the electric power generator set 1' can be checked and managed in analysis, registering and so on of the data by use of the operation-and-display unit 28 of the electric power generator set 1' or a device remote from the electric power generator set 1' (such as the personal computer 35 or the supervisory operation-and-display unit 29). Furthermore, on the basis of the above data and corresponding to change of the driving condition of the electric power generator set 1', inputting operation can be done with the operation-and-display unit 28, or with the supervisory operation-and-display unit 29 in no need of a user's approach to the electric power generator set 1', thereby increasing facilitation for using the cogeneration system. Accordingly, a user can satisfactorily realize the effect of his/her purchased cogeneration system.

Explanation will be given on charts displayed on a display 32 provided in the operation-and-display unit 28 as follows with reference to FIGS. 9 to 14, which is also applicable to the supervisory operation-and-display unit 29 (or the personal computer 35).

The operation-and-display unit 28 serving as the input/output means has the display 32, which displays the data diagrammatized according to a processing program stored in the operation-and-display unit 28.

In the present embodiment, the current transformers CT1 and CT2 detect the current of the commercial electric power from the commercial electric power supply 40, and circuits in the inverters 6a and 6b detect the current of the generated electric power from the generator 3. However, means for detection thereof are not limited to the above.

The control unit 5 processes the detected data concerning the electric power values and water-heat energy so as to calculate data concerning the electric power values, the water-heat energy, the electric energies and the amount of recovered water-heat energy. However, means for calculation thereof is not limited to the control unit 5. For example, the operation-and-display unit 28 serving as the input/output means may receive the detected data and calculate by use of a computer and processing program stored therein.

Firstly, explanation will be given on a comparative table of FIG. 9, in which the commercial, generated and load electric energies, the amount of recovered water-heat energy, a virtual load electric energy and fuel consumption are listed by the hour.

According to the above-mentioned processing program, the display 32 displays a table in which the above calculated date, i.e., the commercial electric energy, the generated electric energy, the load electric energy, the amount of recovered water-heat energy, the virtual load electric energy and the fuel consumption are lined up by the hour. As mentioned above, since each of the electric energies is calculated every hour, each of the calculated electric energies is listed hour by hour in the list.

If the generator of the present invention is not used, the commercial electric power must essentially cover all the electric power required for electric power consumption devices (including a device for generating hot water). The "virtual" load electric energy required in this case is defined as the total of the commercial electric energy, the generated electric energy and the amount of recovered water-heat energy.

Due to the above construction, a user of the electric power generator set 1' can satisfactorily monitor electric energy generated by the generator 3 and realize the effect of his/her purchased electric power generator set 1'.

Next, explanation will be given on a comparative table of FIG. 10, in which the commercial, generated and load electric energies, the amount of recovered water-heat energy, the virtual load electric energy and the fuel consumption are listed monthly.

According to the above-mentioned processing program, the hourly calculated data of the commercial electric energy, the generated electric energy, the load electric energy, the amount of recovered water-heat energy, the virtual load electric energy and the fuel consumption are totaled at each monthly period so as to calculate the respective monthly electric energies and the monthly amount of heat energy, and the display 32 can display a list of the monthly electric energies and corresponding electric charges.

The operation-and-display unit 28 previously memorizes a unit cost of the commercial electric power per kWh (purchased electric power cost) shown in FIG. 10 informed by the commercial energy supplier (electric power company). The control unit 5 calculates a unit cost of the generated electric power per kWh on the basis of the cost of fuel required for driving the engine 4, and corresponding to increase/decrease of fuel consumption.

A user can compare monthly variation of the virtual load electric power (¥/month) with the total monthly charge of the commercial electric power, the generated electric power and the water-heat energy, as shown in FIG. 10, so as to easily grasp the effect of his/her installation of cogeneration system of the present invention, i.e., the amount of reduction of energy cost. Further, if data of overhead expenses concerning the generator of the present invention, such as its purchase, appurtenant construction, management and maintenance, repair, and personnel expenses are taken into account in calculation of unit costs (per kWh) and monthly charges of the generated electric power and the water-heat energy, a user can further accurately predict a period required for recovery of investment for equipment of the electric power generator set, thereby increasing his/her satisfactory appreciation. The unit cost (per kWh) of the generated electric power and the water-heat energy are calculated by the following formula:

(Unit cost per kWh of the generated electric power and the water-heat energy (¥/kWh))= (Fuel cost (¥/month))/(Total of the monthly used generated electric power and water-heat energy (kWh/month))

The comparison is monthly in the embodiment of FIG. 10. Alternatively, the comparison may be daily or yearly.

Figure 11:
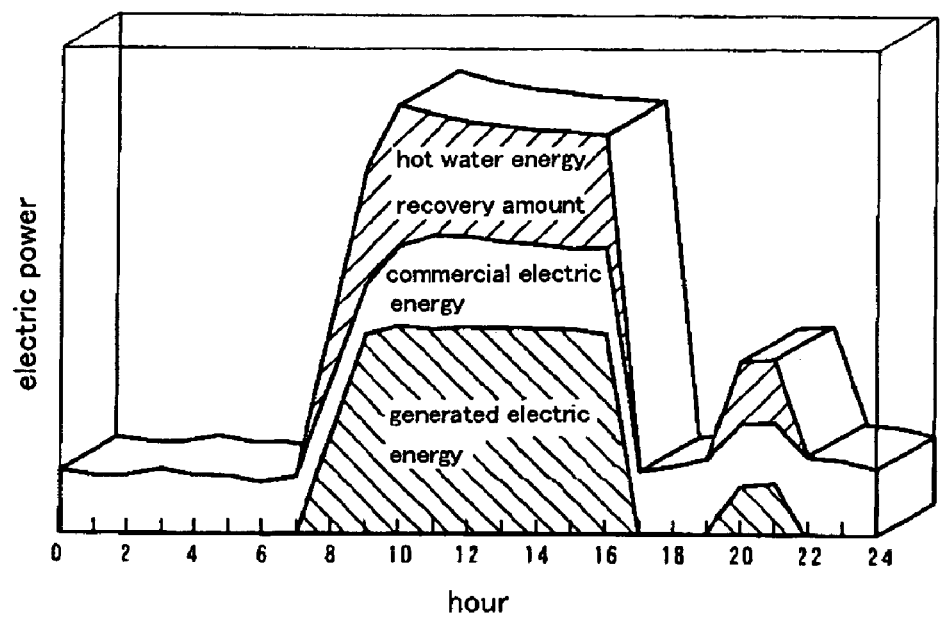
FIG. 11 is a graph displayed by the electric power generator set, representing the respective hourly commercial and generated electric energies and the hourly amount of recovered water-heat energy.

An example of graphs, shown in FIG. 11, representing the hourly commercial and generated electric energies and the hourly amount of recovered water-heat energy will be described.

The graph of FIG. 11 is made by graphing the comparative table in FIG. 9. The axis of abscissas designates hour-by-hour passage of time, and the axis of ordinates designates variations of the respective electric energies.

Due to the above construction, a user can compare the electric energies supplied by the respective electric power systems with each other every hour, so as to know in which hour the load electric power increases or decreases in a day, and to know what is the best electric power generating pattern for cost reduction corresponding to items of his/her contract with the electric power company. Therefore, the user can recognize the effect of his/her investment for equipment of the electric power generator set 1'.

Figure 12:
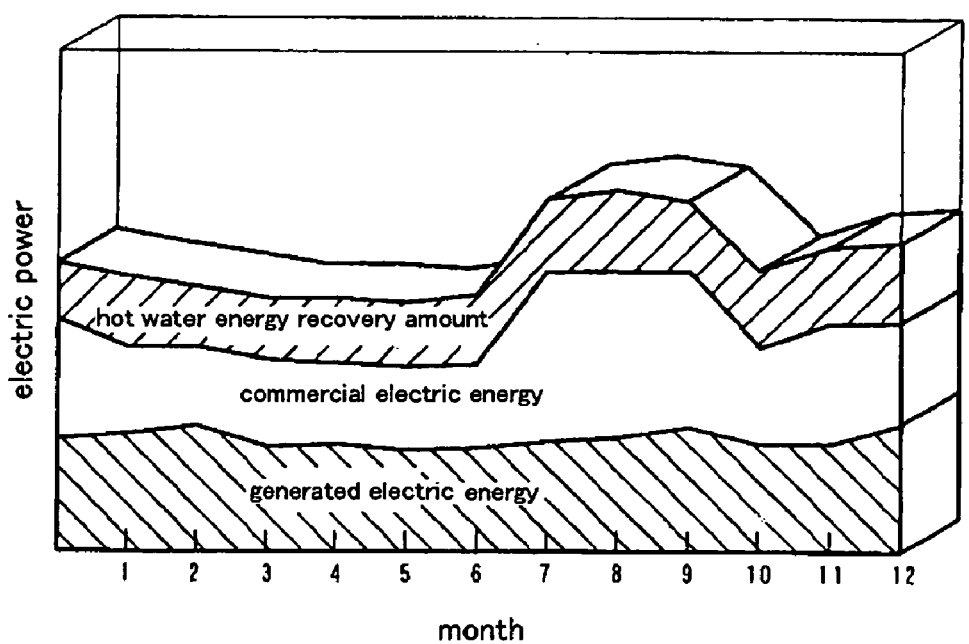
FIG. 12 is a graph displayed by the electric power generator set, representing the respective monthly commercial and generated electric energies and the monthly amount of recovered water-heat energy.

An example of graphs, shown in FIG. 12, representing the monthly commercial and generated electric energies and the monthly amount of recovered water-heat energy will be described.

The graph in FIG. 12 represents comparison of the monthly commercial electric energy with the monthly generated electric energy, and shows variation of the monthly load electric energy. The axis of abscissas designates month-by-month passage of time, and the axis of ordinates designates variations of the respective electric energies.

Due to the above construction, a user can compare the electric energies supplied by the respective electric power systems with each other every month, so as to know in which month the load electric power increases or decreases in a year, and to know what is the best electric power generating pattern for cost reduction corresponding to items of his/her contract with the electric power company. Therefore, The user can recognize the effect of his/her investment for equipment of the electric power generator set 1'.

Figure 13:
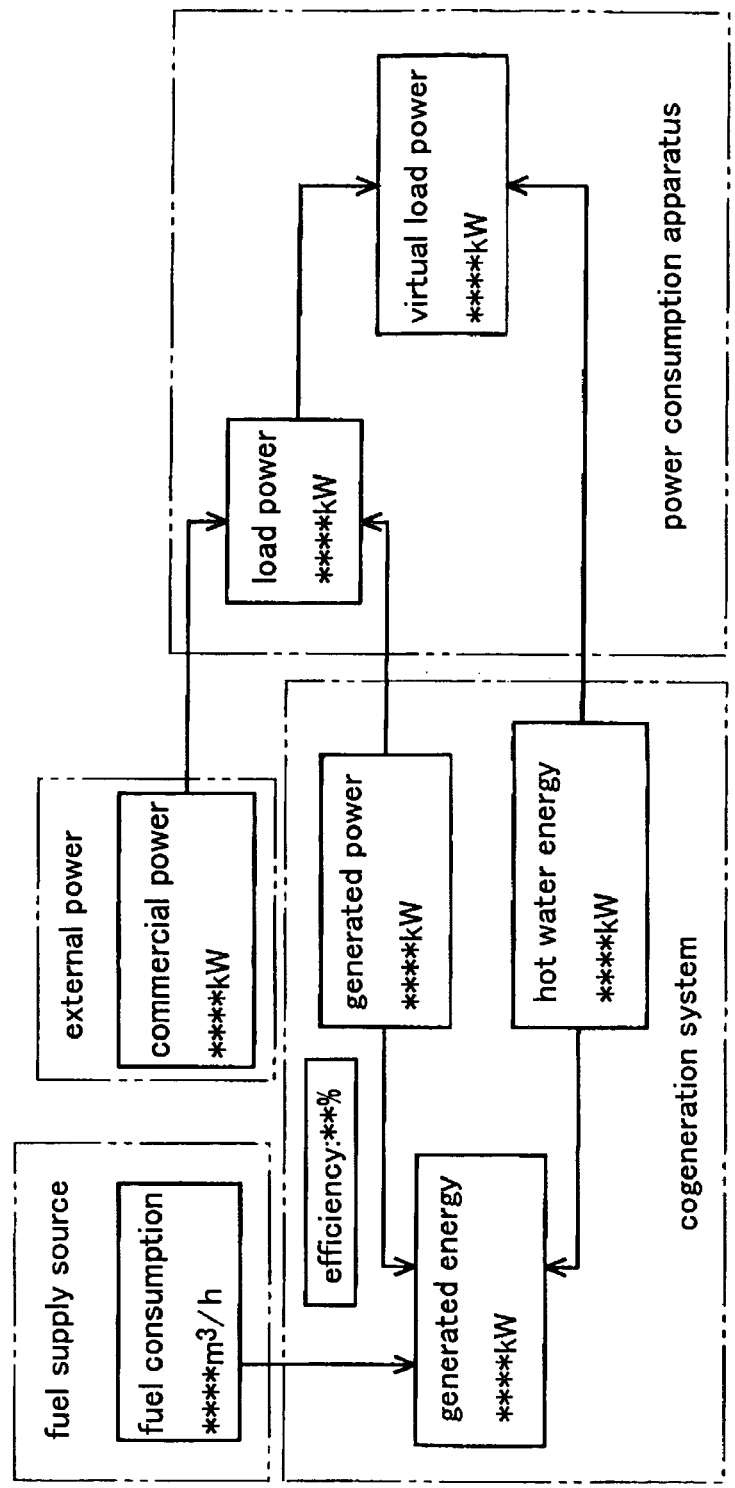
FIG. 13 is a system conceptual diagram displayed by the electric power generator set, representing the respective currently supplied electric energies.

An example of conceptual diagrams of electric power system, shown in FIG. 13, representing electric power values currently supplied by the respective electric power systems will be described.

According to the above-mentioned processing program, the display 32 displays the conceptual diagram of the electric power systems, on which electric power values supplied by the respective electric power systems can be displayed corresponding to the respective electric power systems. The electric power values, the water-heat energy and the fuel consumption displayed on the display 32 are the above-mentioned detected data and calculated data, and updated at each period of detection of the commercial and generated current values by the inverter 6a. Namely, change of each electric power value is displayed on the display 32 in real time.

Incidentally, the "generated energy" in FIG. 13 is magnitude of usable energy (i.e., the electric energy and the recovered water-heat energy) out of various energies generated by the generator. This is counted as an important parameter together with the weight of used fuel per unit time and the combustion energy of fuel per unit weight thereof to understand the energy efficiency of the generator (=(the generated energy)/(the combustion energy of fuel)*100(%)).

Due to the above construction, a user can satisfactorily check momentarily change of the electric powers supplied by the respective electric power systems, and satisfactorily easily grasp variation of the supplied electric powers in image because the supplied electric power values are displayed corresponding to the conceptual diagram.

Figure 14:
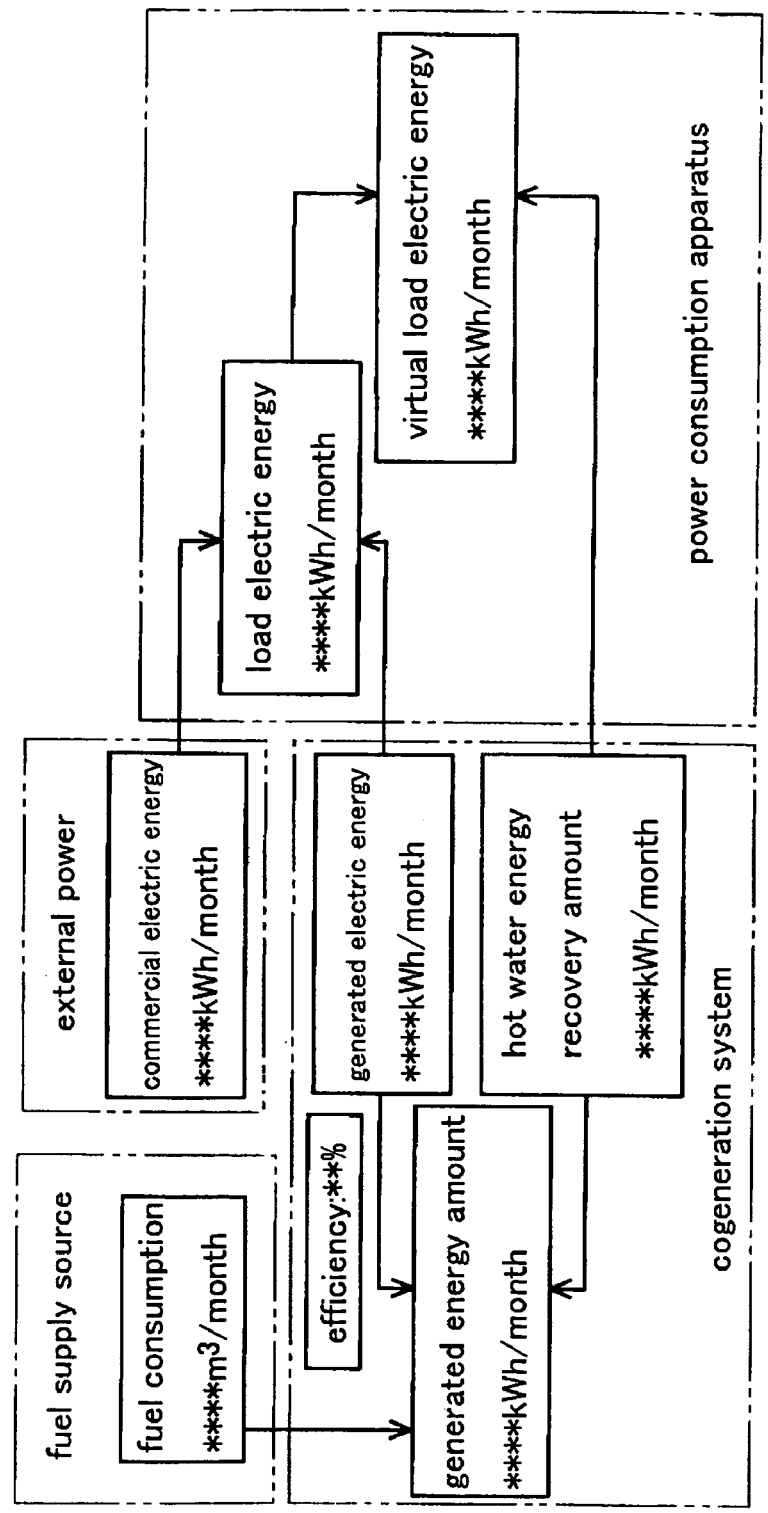
FIG. 14 is a system conceptual diagram displayed by the electric power generator set, representing the respective monthly electric energies.

An example of conceptual diagrams of electric power system, shown in FIG. 14 representing monthly supplied electric energies supplied the respective electric power systems and the monthly amount of heat energy will be described.

According to the above-mentioned processing program, the display 32 displays the conceptual diagram of the electric power systems, on which the monthly supplied electric energies of the respective electric power systems, the monthly amount of recovered water-heat energy, and the monthly fuel consumption can be displayed corresponding to the respective electric power systems. Each of the monthly electric energies is the monthly total of the calculated data of the corresponding hourly electric energies and the hourly amount of recovered water-heat energy, similarly to the comparative table of FIG. 10 representing the respective monthly commercial and generated electric energies, the monthly amount of recovered water-heat energy and the monthly virtual load electric energy.

Due to the above construction, a user can satisfactorily check the monthly electric energies supplied by the respective electric power systems, and satisfactorily easily grasp comparison of the monthly electric energies and the monthly amount of recovered water-heat energy in image because the supplied electric energies and the amount of recovered water-heat energy are displayed corresponding to the conceptual diagram.

The period of the comparison is not limited to each month, and it may be each day or each year.

As mentioned above, since the cogeneration system using the electric power generator set 1' is provided with the image-displaying means, i.e., the display 32 displaying various calculated data concerning the values of the electric powers and the water-heat energy in charts, a user can be informed of the cost merit easily in no need of complicated calculation.

Further, since the system is provided with the means for calculating fuel consumption for driving the engine and the image-displaying means, i.e., the display 32 which displays the respective electric energies and the fuel consumption in a table, a user can be satisfied with such an effect of the system that he or she can further accurately grasp the unit cost of electric power generated by the generator and the unit cost of the water-heat energy on the basis of the actual data.

The operation-and-display unit 28 serving as the input/output means of the control unit 5 can be used as output means for taking out each of the above-mentioned data from the electric power generator set 1'.

In this regard, the operation-and-display unit 28 has a mechanism for outputting to an IC card (card-like device) 33 serving as data-storage means, and a mechanism for outputting to a printer 34 serving as data-registering means. Therefore, each of the above-mentioned data can be memorized in the IC card 33, and numerical information of each of the above-mentioned data and the above-mentioned diagrams (such as FIGS. 9 to 14) can be printed by the printer 34.

Due to the above construction, each of the above-mentioned data can be collected by the IC card 33 so as to be read by a device which is not networked with the electric power generator set 1'. Especially if a computer reads the data from the IC card 33 and the computer stores a data processing program different from those stored in the control unit 5 and operation-and-display unit 28, the data processing can enhance variation of electric power management.

The printer 34 can print the numerical information of each of the above-mentioned data and the above-mentioned diagrams. Namely, due to each of the above-mentioned data registered by the data-registering means, the user can check change of electric power supply and electric energy at the place of the operation-and-display unit 28. Especially in the case of providing the printer 34, the printer 34 can serve as main means for checking the data and diagrams thereof, whereby a small liquid crystal display, for example, can be used as the display 32 so as to reduce costs thereof.

The system using the electric power generator set 1' has means for detecting and warning abnormalities of the system on the basis of the calculated results.

In this regard, an abnormality detection program is stored in the control unit 5 or the operation-and-display unit 28 in the control system 2, or in the personal computer 35 or the supervisory operation-and-display unit 29 disposed outside the generator, so as to warn unexpected accidents and fault of the devices to a conservational administrator (a user, a maker or a third person doing conservation and administration) in an instant, thereby enabling quick action against abnormalities.

For example, the value of the water-heat energy relative to the value of the generated electric power does not change greatly unless abnormalities occur in the devices. However, if the entrance side thermometer 44, the exit side thermometer 45 or the flowmeter 46 breaks down, the value of the water-heat energy becomes abnormally large or small, or is not displayed. Also, if sediments adhere to the inner wall of the primary cooling water passage 8 or the secondary cooling water passage 42 in the heat exchanger 41, the flux detected by the flowmeter 46 becomes small, the entrance side temperature T1 becomes abnormally large, or the rotation frequency of the radiator fan 7*a* increases so as to prevent abnormal temperature rise of the primary cooling water.

The abnormality detection program always supervises magnitudes of the detected data and calculated data and balance of magnitude between the data so as to detect abnormalities of the generator in an instant.

An alarm device 48 is disposed on the outer surface of the generator or at a position distant therefrom and connected to the generator with a wire or on radio (preferably, disposed near the conservational administrator). When an abnormality is detected, the alarm device 48 is tripped, and the operation-and-display unit 28 or the device outside the generator, i.e., the personal computer 35 or the supervisory operation-and-display unit 29, displays a probable troubled part or parts, thereby urging a quick measure. The alarm device 48 may have any means for stimulating any of the human's five senses, such as sound, light or vibration.

In this way, the cogeneration system using the electric power generator set 1' has the means for detecting abnormalities, which is a program stored in the control unit 5 or the operation-and-display unit 28 in the control system 2, or stored in the personal computer 35 or the supervisory operation-and-display unit 29 outside the generator. The cogeneration system also has the means for warning abnormalities, which are the alarm device 48 and any of the operation-and-display unit 28 and the personal computer 35 or the supervisory operation-and-display unit 29 disposed outside the generator.

As a result, the electric power generator set 1' is ready to have a quick action against failures therein, thereby being advantageous in its safety for a user having little knowledge of machinery, and in its minimization of reduction of energy cost merit caused by breakdown thereof.

With regard to controlling of the electric power generator set 1', a user can always control it and change the driving condition of the electric power generator set 1' in the vicinity thereof or a place distant therefrom. Further, the electric power generator set 1' may be so constructed that several typical programs of possibly frequent driving patterns are prepared in a control system 2 so that a user can choose one of the programs corresponding to operation status. Otherwise, a program of learning function may be stored so that driving condition may be controlled automatically so as to reduce an ecological burden or the total electric power cost on the basis of operation status of the user.

As mentioned above, the cogeneration system using the electric power generator set 1' has the control system 2 serving as the controlling means for minimizing the ecological burden or the total electric power cost on the basis of the calculated results.

Therefore, a user can be satisfied with the cogeneration system which can be used in an optimal condition for his/her method and purpose of use thereof in no need of complicated calculation.

Next, explanation will be given on an electric power system constructed by connecting a plurality of electric power generator sets in parallel as a third embodiment of the present invention.

Figure 15:
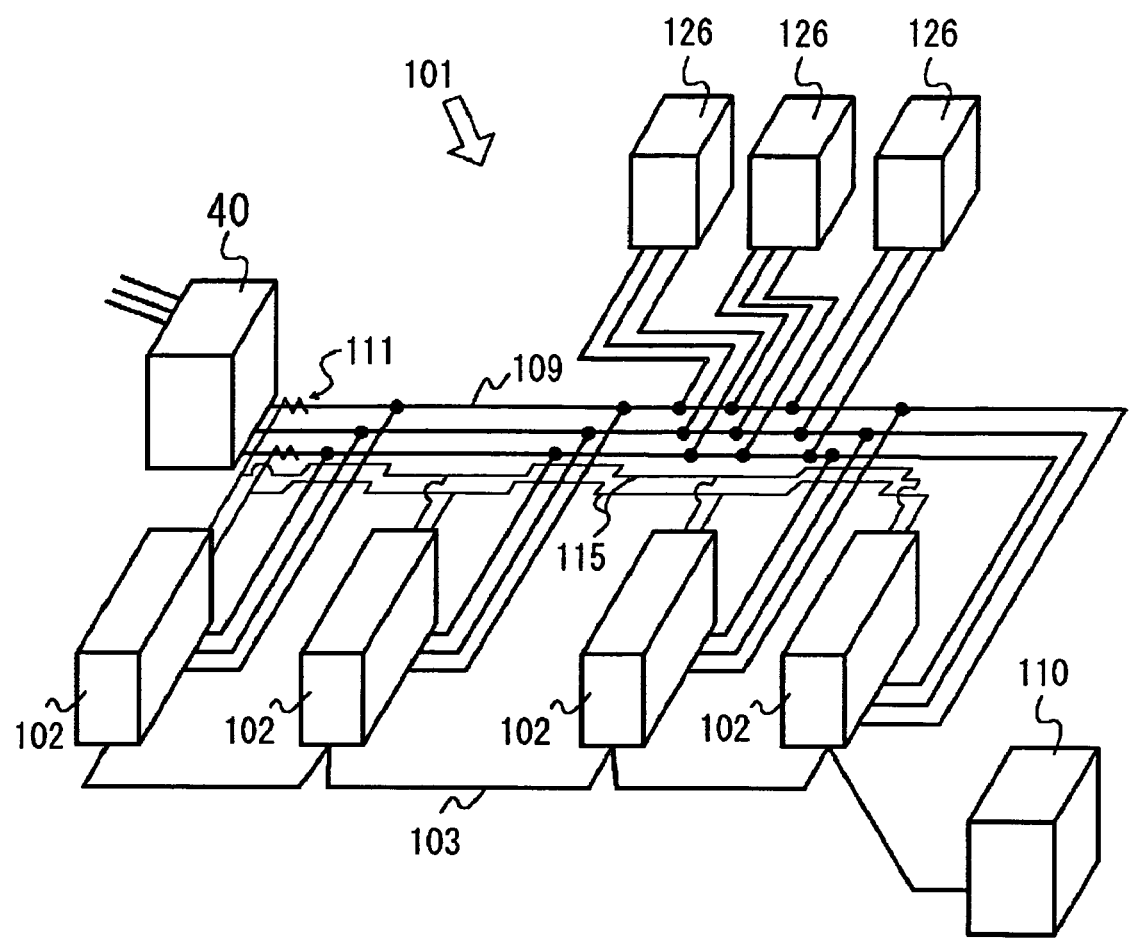
FIG. 15 is a schematic diagram of an entire construction of an electric power generation system according to a third embodiment of the present invention.

Firstly, explanation will be given on an entire construction of this electric power system 101 according to FIG. 15. The electric power system 101 comprises a plurality of electric power generator sets 102 and a control system 110. Each pair of neighboring electric power generator sets 102, i.e., each pair of neighboring later-discussed control units 105 are mutually connected through communication lines 103 for communication of control signals and various data. In this embodiment, the communication lines 103 adopt the multidrop type connection facilitating for easy extension of the electric power generator sets 102.

In the electric power system 101, each of the electric power generator sets 102 connects its output side to electric power transmission lines 109 so as to interconnect to a commercial electric power supply 40 serving as an external electric power supply. Accordingly, the commercial electric power and the generated electric power are supplied to loads 126 connected to the electric power transmission lines 109.

A construction of each electric power generator set 102 will be described in accordance with FIG. 16. Each electric power generator set 102 has an engine 106, a generator 107, inverters 108 and the control unit 105. The control unit 105 and the inverters 108 constitute a control system controlling drive of the electric power generator set 102.

The engine 106 is connected to the generator 107 so as to drive the generator 107.

The engine 106 is connected to the control unit 105 including an engine controller through a control line 114 so that output of the engine 106 is controlled on the basis of command from the control unit 105.

Additionally, the engine 106 may introduce cooling water thereinto so as to take out heat generated in the engine 106 with the cooling water. In this case, the electric power system 101 is used as so-called cogenerator.

The inverters 108 are connected to an output side of the generator 107 so that alternating current outputted from the generator 107 is converted into direct current and inputted into the inverters 108.

The inverter 108 comprises a controller 123 (see FIG. 17) for controlling the frequency of alternating current, and for monitoring the voltage and current of electric power inputted from the generator 107 and the voltage and current of its output electric power, and the electric energy.

Figure 16:
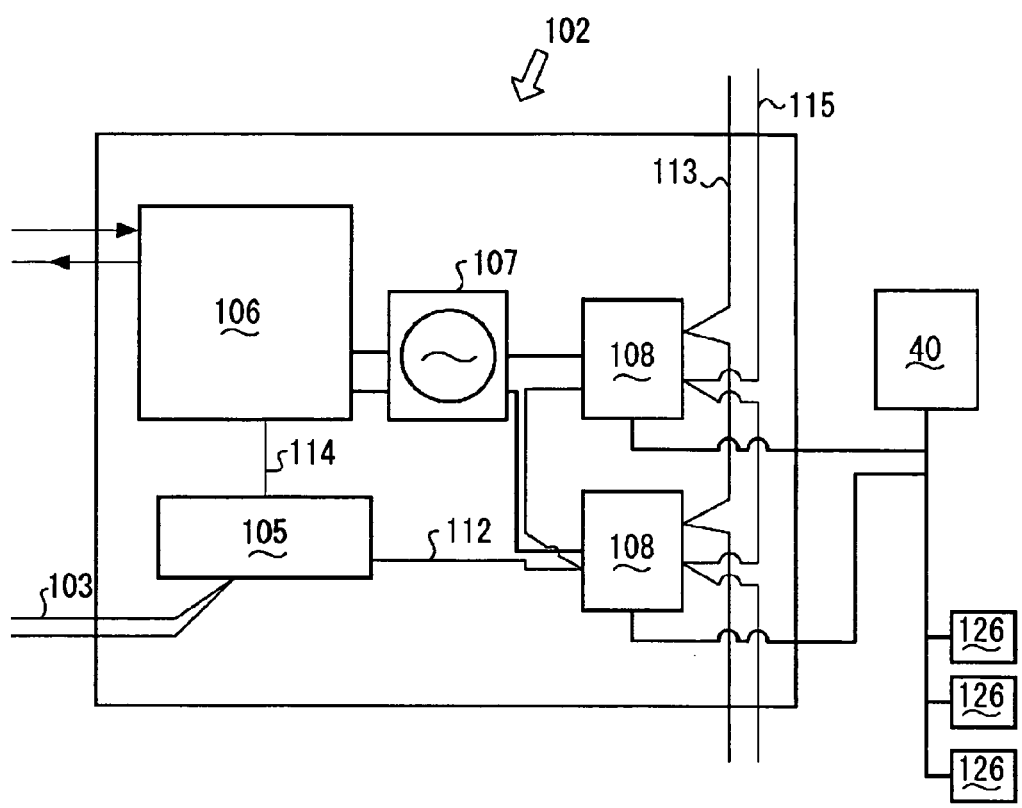
FIG. 16 is a diagram showing a construction of an electric power generator set of the electric power generation system.

In the construction shown in FIG. 16, two inverters 108 are connected to each generator 107 so that each inverter 108 supplies electric power individually. Such a multiple inverters 108 enables individual output control of each inverter 108, thereby flexibly corresponding to change of load.

One of the control units 105 serves as a master unit for centralized control over the other control units 105 so as to control drive/stop of its own generator 102 or each of the other generators 102. The function as the master unit is built in each of the control units 105. Each control unit 105, if one of the other control units 105 functions as the master unit, follows the control unit 105 as the master unit, and if needed, it can be selected as the master unit to control the other control units 105.

Accordingly, while the control unit 105 disposed in each electric power generator set 102 communicates with the control units 105 disposed in the other electric power generator sets 102 through the communication lines 103, one of the control units 105 is optionally selected as the master unit to cooperatively control all the other control units 105. In this embodiment, the communication lines 103 adopt the multidrop type connection facilitating for easy extension of the electric power generator sets 102.

Various communication lines in FIG. 16 will be described.

The communication lines 103 connects the control units 105 in all the electric power generator sets 102 to each other, thereby enabling communication of control information among the control units 105.

In each electric power generator set 102, communication lines 112 connect the inverters 108 with the control unit 105 so as to transmit control signals and signals indicating a status of the inverters 108 between the inverters 108 and the control unit 105.

Communication lines 113 connect the inverters 108 in each electric power generator set 102 to the inverters 108 in the other electric power generator sets 102, thereby enabling communication of control signals concerning output control of the inverters.

Signal lines 115 are extended from current detectors 111 and connected to the inverters 108 disposed in each electric power generator set 102 so as to detect current value of the commercial electric power system in each inverter 108.

Figure 17:
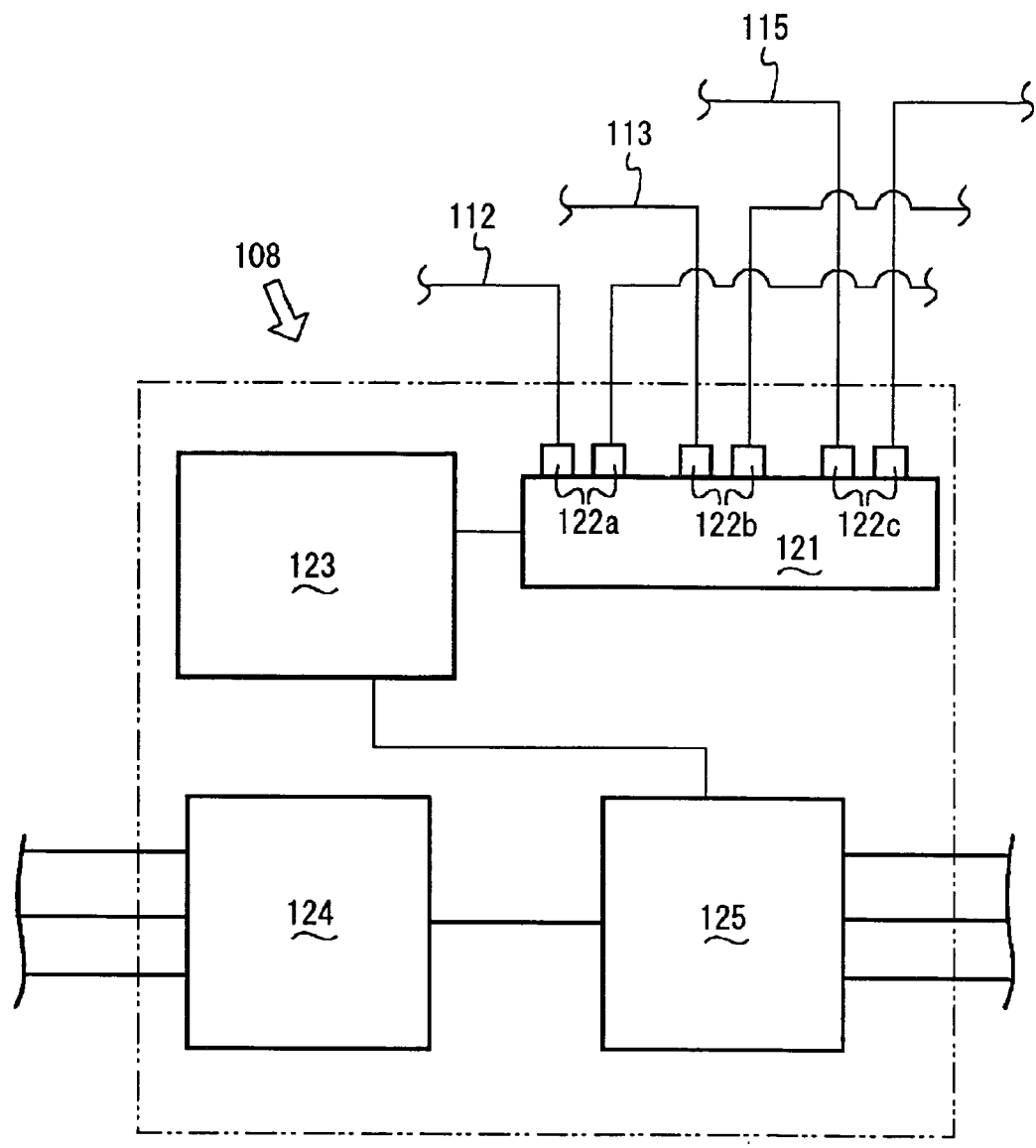
FIG. 17 is a diagram showing a construction of an inverter of the electric power generation system.

A construction of the inverter 108 will be described in accordance with FIG. 17.

Each of the inverters 108 is provided with the controller 123, a rectifying circuit 124, an output control part 125 and a communication part 121.

The rectifying circuit 124 converts alternating current of the electric power generated by the generator 107 into direct current. The output control part 125 is supplied with the direct current electric power, converts it into alternating current and outputs it.

The controller 123 is connected to the output control part 125 so as to control the electric power outputted from the output control part 125.

The controller 123 is connected to the communication part 121, to which the above-mentioned communication lines to the respective inverters 108 can be connected so as to enable communication of the corresponding inverter 108 with the inverters 108 disposed in the other electric power generator sets 108, with the control unit 105 in the same electric power generator set 102, and detection of electric current from the commercial electric power system.

The communication part 121 and communication lines will be described as follows.

The communication part 121 has input/output connection ports 122a connected to the communication lines 112 so as to enable communication of the corresponding inverter 108 with the control unit 105 in the same electric power generator set 102.

The communication part 121 has input/output connection ports 122b connected to the communication lines 112 so as to enable communication of the inverter 108 in the same electric power generator set 102 with each other and communication thereof with the inverters 108 in the other electric power generator sets 102.

The communication part 121 has input/output connection ports 122c connected to the signal lines 115 so as to connect the corresponding inverter 108 with the current detectors 111. Therefore, one of the inverters 108 can be optionally selected to detect the electric current from the commercial electric power system.

A wiring construction among the inverters will be described in accordance with FIG. 18.

In each electric power generator set 102, the control unit 105 is connected to the inverters 108 through the communication line 112.

All the inverters 108 are connected with one another through the communication lines 113 so as to transmit output control information among all the inverters 108.

The signal lines 115 connect each inverter 108 with the other inverters 108, and the current detectors 111 are disposed at the upstream side of a joint of the electric power transmission line 109 to the loads 126 to the commercial electric power supply 40 and the signal line 115 of the most upstream inverter 108 in the most upstream electric power generator sets 102 (toward the commercial electric power supply 40). Therefore, one of the inverters 108 can be optionally selected so as to enable detection of the electric current from the commercial electric power system. Current transformers or the like can be used as the current detectors 111.

Figure 18:
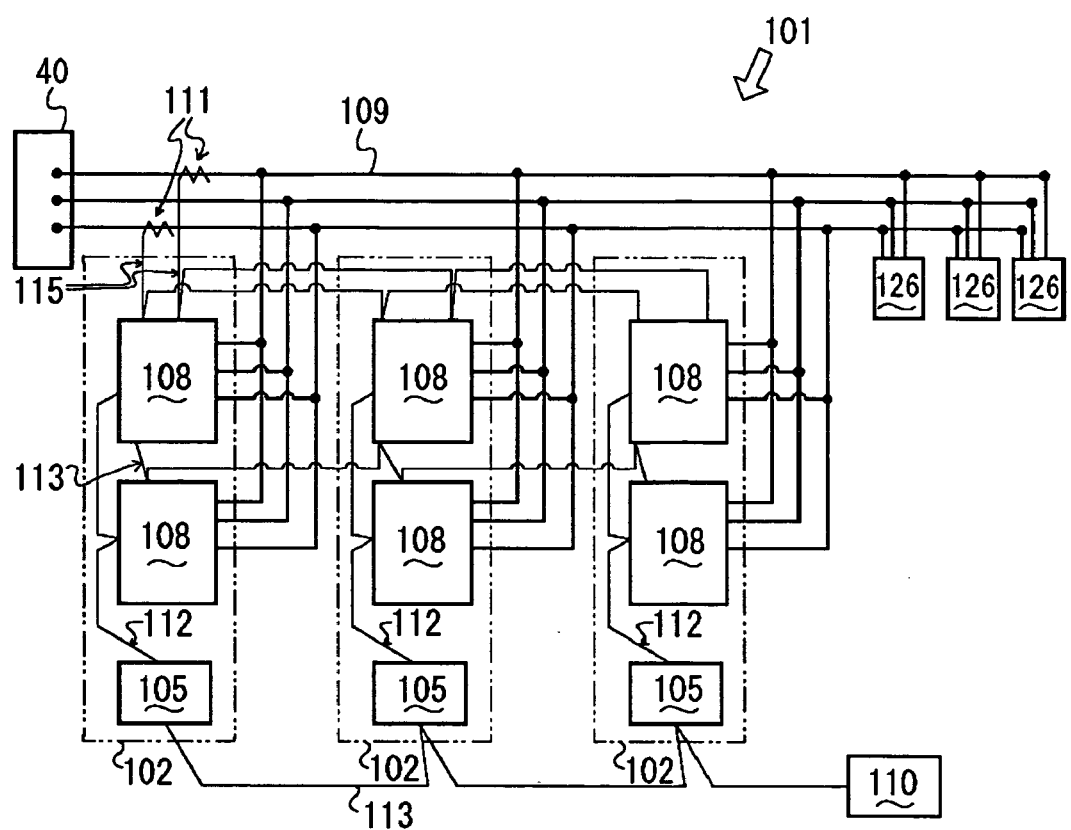
FIG. 18 is a diagram showing a wiring construction among a plurality of inverters of the electric power generation system.

FIG. 18 does not illustrate all the inverters 108 connected to the signal lines 115. However, all the inverters 108 are actually connected to the current detectors 111 through the signal lines 115.

In this way, in the electric power system 101, the inverters 108 in all the electric power generator sets 102 can detect the electric current from the external electric power system. Therefore, it is possible that only the troubled electric power generator set 102 having abnormality in its detected current value is stopped and maintained while the other electric power generator sets 102 are kept in interconnection with one another without stopping, and that all the electric power generator sets 102 can be equaled in their cumulative drive times.

Further, as mentioned above, one of the inverters 108 serves as the master unit for centralized control over the other inverters 108 so as to control the generated electric output of itself or the others. The function as the master unit is built in all the inverters 108. Each inverter 108, if one of the other inverters 108 functions as the master unit, follows another inverter 108 as the master unit, and if needed, it can serve as the master unit for centralized control over the other inverters 108.

In the present embodiment, the communication lines 103, 112 and 113 adopt multidrop type connection so as to facilitate for easy extension of the electric power generator sets 102.

Next, explanation will be given on a control method of the above-mentioned electric power system 101 for distribution of electric power supply.

With regard to the present control, one of the inverters serves as the master unit cooperatively controlling the other inverters. The inverter serving as the master unit accumulates information concerning generated electric outputs required for the other respective inverters, calculates total generated output required for the whole electric power system, and determines the number of the electric power generator sets to be driven on the basis of the calculated result.

Figure 19:
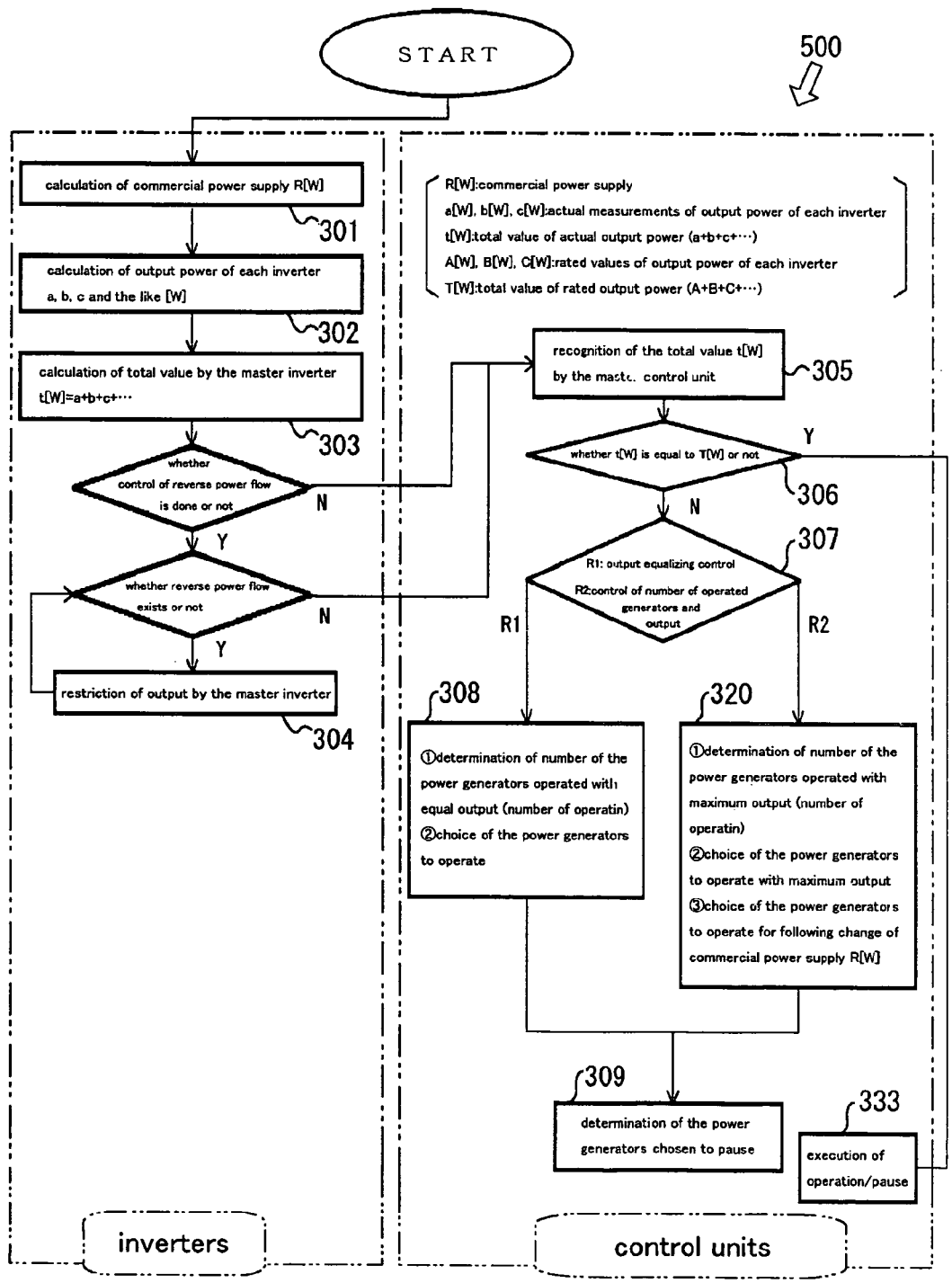
FIG. 19 is a flow chart for controlling the electric power generation system by use of the inverters and a control unit.
Figure 20:
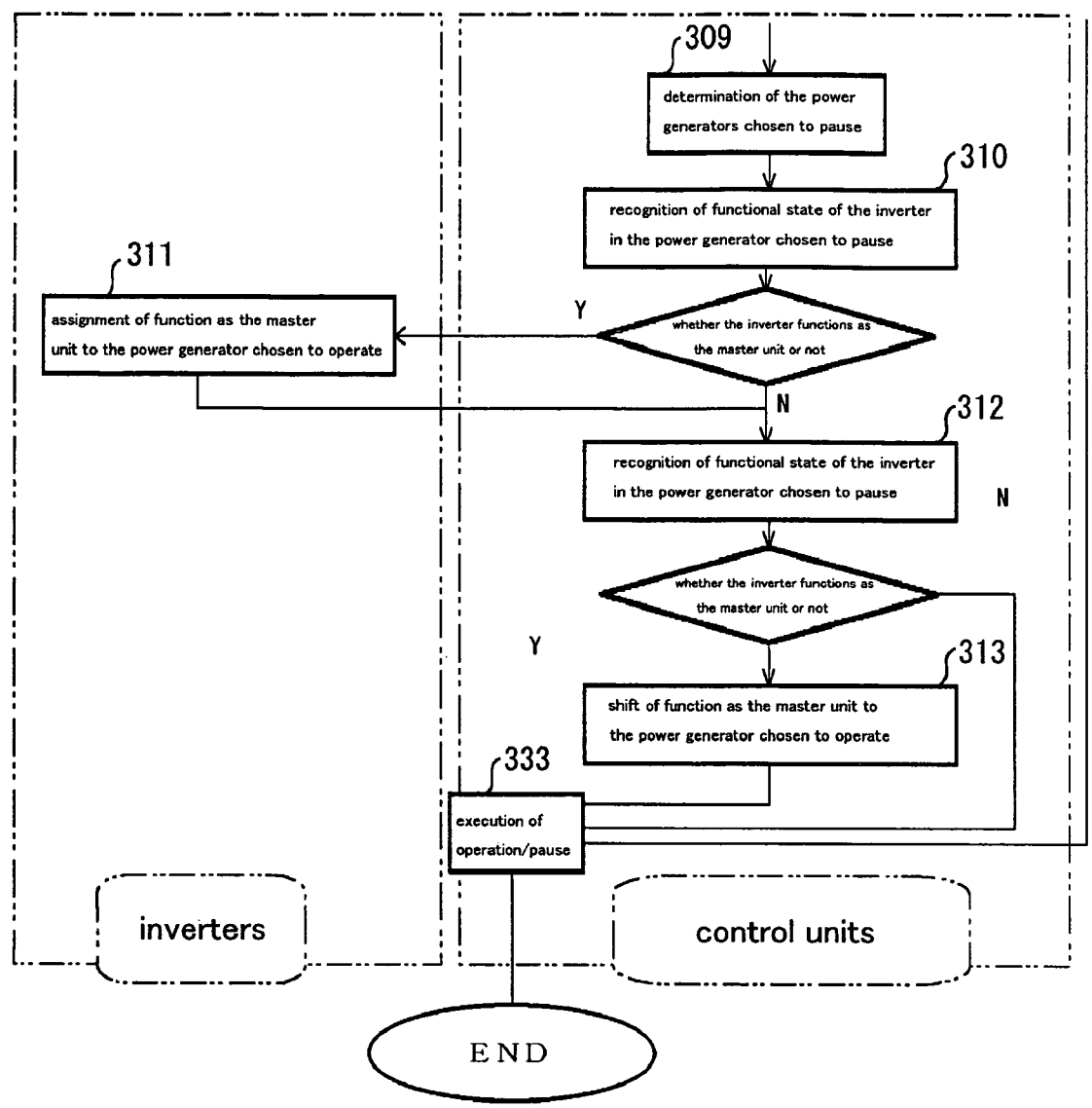
FIG. 20 is a flow chart continued from FIG. 19.

The present control is represented by a flow chart 500 of FIGS. 19 and 20. The present control according to the flow chart 500 will be described as follows.

Each inverter 108 detects electric current from the commercial electric power system by the current detector 111 so as to calculate a commercial supply electric power R [W] in the electric power transmission line 109 from the commercial electric power supply 40 (a step 301).

The inverters 108 calculate their respective outputs a, b, c, . . . [W] (a step 302). Namely, the outputs a, b, c, . . . [W] are observational electric power outputs of the respective inverters 108. On the other hand, hereafter, rated (maximum) outputs of the inverters 108 are referred to as rated outputs A, B, C, . . . [W].

Then, arbitrary one of the inverters 108 as the master unit (hereinafter, referred to as a "master inverter 108") accumulates data of the observed outputs a, b, c, . . . from the other inverters 108 and calculates the observed total value t [W] of the outputs a, b, c, . . . (a step 303). Alternatively, each control unit 105 may accumulate data of output of the corresponding inverters 108 in each electric power generator set 102.

When the electric power system 101 is used as an interconnection system without reverse electric power flow, the master inverter 108 cooperates with the other inverters so as to control their generated output to prevent reverse flow of electric power from the electric power system 101 to the external electric power supply.

The master inverter 108 controls output thereof or of the other inverters as the above so as to prevent the reverse electric power flow (a step 304). This step can be arbitrarily set into the program of the control unit 105 so that a user can select whether the reverse electric power flow is allowed or prevented. After the control for prevention of the reverse electric power flow, the detection of output electric power restarts.

Next, the control unit 105 as the master unit (hereinafter, referred to as a "master control unit 105") monitors the total value t [W] from the master inverter 108 (a step 305).

Alternatively, the master control unit 105 may monitor the total value t [W] obtained by totaling all the data accumulated by the respective control units 105.

Then, the control unit 105 checks whether the above obtained total value t [W] agrees with a total value T [W] of the rated outputs A, B, C, . . . of the electric power generator sets 102 under operation or not (a step 306).

By this check, it is checked whether the whole electric power system 101 demonstrates the highest performance or not, that is, whether the output electric power of the electric power generator sets 102 under operation reaches the maximum or not.

When the total value t [W] agrees with the total value T [W], it is considered that the output of the electric power generator sets 102 under operation reaches the maximum, that is, the whole electric power system 101 is operated to output its maximum electric power, thereby dropping the following control.

On the other hand, when the total value t [W] is smaller than the total value T [W], the master control unit 105 selects either a program (a route R1) of operating the counted electric power generator sets 102 (determined in number as the above) equalized in output or a program (a route R2) of operating specific electric power generator sets 102 with their maximum output (a step 307).

Namely, a user can select either the program of operating the counted electric power generator sets 102 equally in output (the route R1) or the program of operating the specific electric power generator sets 102 fully in output supported by another electric power generator set 102 compensating for shortage of output (the route R2).

Of the two, firstly, the program of operating all the counted electric power generator sets 102 equally in output will be described.

The present program (the route R1) forcibly equalizes outputs of the inverters of all the counted electric power generator sets 102.

Firstly, the number of the electric power generator sets 102 to be operated equally in output is determined, and the electric power generator sets 102 to be operated (the electric power generator sets intending to operate) are chosen (some of the electric generators 102 are counted to be operated) (a step 308).

The count and choice of devices depends on calculation of the accumulated operation time of each electric power generator set 102 for "equalizing the accumulated operation times of the respective electric power generator sets 102", for "rest of the electric power generator sets 102 at the time of maintenance following the schedule of maintenance", or for the like. In this way, the electric power generator sets 102 are controlled by the corresponding control units 105 to be shifted in operation at each established period.

The rest electric power generator set 102, if it exists, is also counted as a target to be operated.

According to the count and choice, any of the operated electric power generator sets 102 may be shut down. It means selection of the electric power generator set 102 to be rest (a step 309).

Then, it is checked whether the inverter 108 in the electric power generator set 102 to be rest serves as the master unit or not (a step 310).

If the inverter 108 in the electric power generator set 102 to be rest serves as the master unit, the function of the master unit is shifted to another inverter 108 in the electric power generator set 102 to be operated (a step 311).

Furthermore, it is checked whether the control unit 105 in the electric power generator set 102 to be rest serves as the master unit or not (a step 312).

If the control unit 105 in the electric power generator set 102 to be rest serves as the master unit, the function of the master unit is shifted to another control unit 105 in the electric power generator set 102 to be operated (a step 311).

In addition, preferably, each control unit 105 monitors the operation/rest state of the corresponding electric power generator set 102 or of the other electric power generator sets 102, and if the control unit 105 and the inverter 108 in the same electric power generator set 102 serve as the master units, the control unit 105 automatically shifts the functions thereof and of the corresponding inverter 108 as the master units to the control unit 105 and the inverters 108 in another electric power generator set 102 under operation.

According to the above steps 309 to 313, before shutting down of the electric power generator set 102 having the control unit 105 and the inverter 108 serving as the master units, the functions as the master units are shifted to the control unit 105 and the inverter 108 in another electric power generator set 102.

Accordingly, the inverter 108 of one of the electric power generator sets 102 under operation is set as the master unit to cooperatively control the other inverters 108, and then, the operating electric power generator set 102 counted to be rest is shut down and the rest electric power generator set 102 counted to be operated starts (a step 333).

Next, the program of operating the specific electric power generator sets 102 fully in output supported by another electric power generator set 102 compensating for shortage of output will be described.

This present program forcibly operates the specific electric power generator sets 102 fully in output, and operates one of the other electric power generator sets 102 so as to make output of its inverter correspond to change of the commercially supplied electric power R [W].

Firstly, the number of the electric power generator sets 102 to be fully operated in output is determined, and the fully operated electric power generator sets 102 and the electric power generator set 102 corresponding to change of the commercially supplied electric power R [W] (the electric power generator sets 102 to be operated) are chosen (a step 320).

The count and choice of devices depends on calculation of the accumulated operation time of each electric power generator set 102 for "equalizing the accumulated operation times of the respective electric power generator sets 102", for "rest of the electric power generator sets 102 at the time of maintenance following the schedule of maintenance", or for the like. In this way, the electric power generator sets 102 are controlled by the corresponding control units 105 to be shifted in operation at each established period.

The rest electric power generator set 102, if it exists, is also counted as a target to be operated.

According to the count and choice, any of the operated electric power generator sets 102 may be shut down. It means selection of the electric power generator set 102 to be rest (a step 309). The hereafter flow (the steps 309 to 333) is the same as the above program for equal output control.

Accordingly, the control system (control unit 105) serving as the master unit collects and accumulates data from the other control systems (control unit 105) concerning the generated electric powers required for the respective electric power generator sets 102, so as to calculate the load electric power of electric power system 101, thereby determining the number of the electric power generator sets 102 to be operated.

In this way, either the equal-output control or the full-output control of the specific electric power generator sets 102 can be selected, and the accumulated operation time of each electric power generator set is equalized.

According to the above flow, each electric power generator set 102 is switched between the operating state and the rest state.

Herein, explanation will be given on features of the above-mentioned two controls (the routes R1 and R2).

With regard to the equal output control (the route R1), the control unit 105 of the electric power generator set 102 serving as the master unit controls its electric power generator set 102 and the other electric power generator sets 102 so as to bring equalization of outputs of the target electric power generator sets 102 to be operated into consideration for determination of the number of operated generators.

Accordingly, all the electric power generator sets 102 are equalized in their operation times in no need of excessive operation and output, thereby prolonging a life of whole electric power system 101.

On the other hand, with regard to the full-output control of the specific electric power generator sets 102 (a route R2), the control unit 105 of the electric power generator set 102 serving as the master unit controls its electric power generator set 102 and the other electric power generator sets 102 so as to bring maximization of outputs of the (several) target electric power generator sets 102 to be operated into consideration for determination of the number of operated generators.

Accordingly, the specific electric power generator sets 102 are operated fully in output so as to demonstrate the best performance (operate in high efficiency). Furthermore, the electric power generator sets 102 to be rest may be chosen among the electric power generator sets 102 under operation.

For example, when the maximum output of one electric power generator set 102 is 10 [kW], the commercially supplied electric power R [W] is 40 [kW], and outputs of five electric power generator sets 102 are 8 [kW], 7 [kW], 9 [kW], 8 [kW] and 8 [kW] respectively, outputs of four electric power generator sets 102 are set to the maximum output 10 [kW] so as to compensate 40 [kW] with the total thereof, thereby resting the one remaining electric power generator set.

In each of these controls (the routes R1 and R2), the control system (control unit 105) serving as the master unit may switch the electric power generator sets 102 under operation at each established period. Namely, the target electric power generator sets 102 to be operated are chosen on the basis of the history of operation time so as to equalize operation times of all the electric power generator sets 102, whereby the accumulative operation time of the specific electric power generator set 102 is prevented from becoming longer than those of the other electric power generator sets 102 so as to prolong a life of whole electric power system 101.

In each of the two controls (the routes R1 and R2), the function as the master unit is shifted between the inverters 108, and between the control units 105.

According to the program, when the inverter 108 and the control unit 105 as the master unit are decided to be rest, the function is shifted to another inverter 108 and control unit 105 so as to maintain the general control necessary for the whole electric power system 101.

Therefore, when a certain electric power generator set 102 requires maintenance while the electric power system 101 remains in interconnection, only the requiring electric power generator set 102 can be rest instead of rest of the other electric power generator sets 102.

Furthermore, the inverter 108 as the master unit must constantly detect the value of electric current from the commercial electric power system so as to ensure the interconnection. In this regard, the inverters 108 of all the electric power generator sets have abilities of detecting the current value, whereby the current value never becomes impossible to be detected even if the specific electric power generator set 102 rests.

Conventionally, only an inverter of one specific electric power generator set detects the value of current from the commercial electric power system so that the electric power generator set 102 to be rest cannot be chosen freely. However, with regard to the present construction, the inverters 108 of all the electric power generator sets 102 can function as the master unit so that the target electric power generator set 102 to be rest can be chosen freely.

Therefore, even the specific electric power generator set 102 can be rest for maintenance without making any of the other power generators 102 rest, so that the operation times of all the electric power generator sets 102 can be equalized.

By the above sequence control flow, the control unit 105 automatically determines operation/rest of the electric power generator sets 102. Alternatively, a user may optionally choose the target electric power generator sets 102 to be operated or rest.

For example, in the step 307 (selection of control method) of the flow chart 500 in FIG. 19, a user may alternatively specify one of the electric power generator sets 102 to be stopped for maintenance.

INDUSTRIAL APPLICABILITY

The present invention is applicable to an electric power supply system comprising a electric power generator set, which includes a generator driven by an engine and an inverter having an ability of interconnecting with an external electric power supply. A typical external electric power supply system is a commercial electric power supply from a electric power plant, any electric power supply system may serve as the external electric supply system if it can interconnect with an output electric power system line of the electric power generator set. The electric power generator set may supply commercial electric power. The electric power generation system of the present invention provides such a satisfying system of managing electric power supplies for users because of use of the image-displaying device for users' easy grasping of the state of used electric power, and provides a plurality of electric power generator sets each of which has high all-around ability to be used, thereby contributing in the reduction of cost, or for various convenience. The present invention is also applicable to construction of a compact electric power system or cogeneration system which recovers waste heat of the electric power generator set.

What is claimed is:

1. An electric power system comprising a plurality of electric power generator sets, each of the electric power generator sets comprising:
    an engine;
    a generator driven by the engine;
    an inverter having an ability of interconnecting the generator with an external power supply;
    means for detecting information concerning electric power from the external power supply and electric power from the electric power generator set;
    means for calculating electric power and energy from the external power supply, electric power and energy from the power generator set, and electric power and energy to a load;
    means for recording each of the calculated electric powers and energies; and
    a control system for controlling output of the generator; wherein
    the electric power system is constructed by interconnecting the control systems with each other; and
    one of the control systems serving as a master unit comprises means for accumulating information on generated power required of the other power generator set(s), the information being transmitted from the other control system(s) of the other power generator set(s); calculating the load electric power of the electric power system; and determining the number of the power generator sets to be operated.

2. The electric power system as set forth in claim 1, wherein each of the power generator sets comprises:
    image-displaying means for displaying a diagram of each electric energy of the external power supply, the power generator set and the load.

3. The electric power system as set forth in claim 1, wherein each of the power generator sets comprises:
    means for calculating fuel consumption of the engine; and
    image-displaying means for displaying each of the electric energy and the fuel consumption in a table.

4. The electric power system as set forth in claim 1, wherein each of the power generator sets comprises:
    means for externally transmitting result calculated by said calculating means.

5. The electric power system as set forth in claim 1, the power generator sets being connected in parallel, wherein each of the power generator sets comprises:
    means for controlling its own generator and inverter cooperatively; and
    means for detecting current value from the external power supply.

6. The electric power system as set forth in claim 5, wherein the control system of each of the power generator sets comprises:
    means for communicating with the control system of the other power generator sets; and
    means for centralized control over the other control systems so as to enable the control systems to serve as the master unit.

7. The electric power system as set forth in claim 1, wherein the control system serving as the master unit comprises:
    means for controlling the counted power generator sets to be operated so as to equalize their outputs.

8. The electric power system as set forth in claim 1, wherein the control system serving as the master unit comprises:
    means for controlling specific one of the counted power generator sets to be operated so as to maximize output thereof.

9. The electric power system as set forth in claim 1, wherein the control system serving as the master unit comprises:
    means for recognizing operation/rest state of its own power generator set or the other power generator set(s) and choosing a control system serving as a next master unit.

10. The electric power system as set forth in claim 1, wherein the control system serving as the master unit comprises:
    means for shifting the power generator set to be operated at each predetermined period.

11. The electric power system as set forth in claim 1, wherein the control system serving as the master unit comprises:
    means for preventing reverse power flow to the external power supply by cooperating with the other control system(s).

12. A system comprising a power generator set comprising:
    an engine;
    a generator driven by the engine;
    an inverter having an ability of interconnecting the generator with an external power supply;
    means for detecting information concerning electric power of each of the external power supply and the power generator set;
    means for calculating electric power and energy of each of the external power supply, the power generator set and a load;
    means for recording each of the calculated powers and electric energies; and
    waste heat recovery means for recovering waste heat from the engine so as to generate heat;
    means for detecting information concerning heat energy consumed for generating hot water;
    means for calculating the heat energy, an amount of the heat energy and energy efficiency;
    means for recording a result calculated by said means for calculating the heat energy; and
    image-displaying means for displaying each electric power of the external power supply, the power generator set and the load of the system, the amount of heat energy, and the energy efficiency in a table.

13. The system as set forth in claim 12, further comprising:
    means for calculating fuel consumption for driving the engine; and image-display means for displaying each of the electric energy, the heat energy, and the fuel consumption in a table.

14. The system as set forth in claim 12, further comprising:

means for externally transmitting the calculated result.

15. The system as set forth in claim 12, further comprising:

means for remote communication to enable the system to be operated remotely.

16. The system as set forth in claim 12, further comprising:

means for detecting abnormality of the system based on the calculated result and informing about the abnormality.

17. The system as set forth in claim 12, further comprising:

means for minimizing ecological load or power cost based on the calculated result.

18. A method of generating power using a plurality of electric power generator sets, each comprising: an engine; a generator driven by the engine; and an inverter having an ability of interconnecting the generator with an external power supply, said method comprising:

(I) operating each electric power generator set by:
  detecting information concerning electric power from the external power supply and electric power from the electric power generator set;
  calculating the electric power and energy from the external power supply, the electric power and energy from the power generator set, and electric power and energy to a load;
  recording each of the calculated electric powers and energies; and
  controlling output of the generator by a control system;

(II) interconnecting the control systems with each other, wherein one of the control systems serves as a master unit; and (III) operating the master control system by:
  accumulating information on generated power required of the other power generator set(s), said information being transmitted from the other control system(s) of the other power generator set(s);
  calculating the load electric power of the electric power system; and
  determining the number of the power generator sets to be operated.

19. A method of generating power using a power generator set comprising: an engine; a generator driven by the engine; and an inverter having an ability of interconnecting the generator with an external power supply, said method comprising:

detecting information concerning electric power of each of the external power supply and the power generator set;

calculating electric power and energy of each of the external power supply, the power generator set, and a load;

recording each of the calculated powers and electric energies; and recovering waste heat from the engine so as to generate heat;

detecting information concerning heat energy consumed for generating hot water;

calculating the heat energy, an amount of the heat energy, and energy efficiency;

recording the calculated results; and displaying each electric power of the external power supply, the power generator set, and the load, the amount of heat energy, and the energy efficiency in a table.

* * * * *